(12) United States Patent
Goslin et al.

(10) Patent No.: US 10,369,487 B2
(45) Date of Patent: Aug. 6, 2019

(54) STORYTELLING ENVIRONMENT: MAPPING VIRTUAL SETTINGS TO PHYSICAL LOCATIONS

(71) Applicant: Disney Enterprises, Inc., Burbank, CA (US)

(72) Inventors: Michael P. Goslin, Sherman Oaks, CA (US); Katherine M. Bassett, Pasadena, CA (US); Eric C. Haseltine, Silver Spring, MD (US); Joseph Logan Olson, Eagle Rock, CA (US)

(73) Assignee: Disney Enterprises. Inc., Burbank, CA (US)

( * ) Notice: Subject to any disclaimer, the term of this patent is extended or adjusted under 35 U.S.C. 154(b) by 120 days.

(21) Appl. No.: 15/041,615

(22) Filed: Feb. 11, 2016

(65) Prior Publication Data
US 2017/0232358 A1    Aug. 17, 2017

(51) Int. Cl.
| | | |
|---|---|---|
| *A63H 33/26* | (2006.01) | |
| *A63H 33/42* | (2006.01) | |
| *A63H 3/28* | (2006.01) | |
| *A63H 17/32* | (2006.01) | |
| *A63H 17/34* | (2006.01) | |
| *G09B 5/06* | (2006.01) | |

(52) U.S. Cl.
CPC .............. *A63H 33/26* (2013.01); *A63H 3/28* (2013.01); *A63H 17/32* (2013.01); *A63H 17/34* (2013.01); *A63H 33/42* (2013.01); *G09B 5/06* (2013.01); *A63H 2200/00* (2013.01)

(58) Field of Classification Search
USPC ............ 434/1, 2, 4, 308, 309; 446/297, 484; 463/1, 9, 30, 36, 39, 40
See application file for complete search history.

(56) References Cited

U.S. PATENT DOCUMENTS

| | | | | |
|---|---|---|---|---|
| 6,773,344 B1 * | 8/2004 | Gabai | ...................... | A63H 3/28 463/1 |
| 6,793,580 B2 * | 9/2004 | Sinclair | ................... | A63F 13/12 434/322 |
| 7,828,697 B1 * | 11/2010 | Oberrieder | ......... | A63B 24/0062 482/1 |
| 8,292,743 B1 * | 10/2012 | Etter | ...................... | H04L 67/38 463/42 |
| 8,632,376 B2 * | 1/2014 | Dooley | .................. | A63F 9/143 273/246 |

(Continued)

*Primary Examiner* — Kurt Fernstrom
(74) *Attorney, Agent, or Firm* — Patterson + Sheridan, LLP

(57) ABSTRACT

A method, computer-readable medium, and system are disclosed for an interactive storytelling environment. The method comprises identifying a plurality of storytelling devices available to participate in a storytelling experience, at least one of the plurality of the storytelling devices comprising a first beacon device. The method further comprises beginning playback of a first story of the storytelling experience, the first story comprising a first plurality of predetermined actions associated with a predetermined first virtual setting, the first virtual setting mapped to the first beacon device. The method further comprises determining a location of a user using the first beacon device, and during playback of the first story and using at least one of the plurality of storytelling devices, producing one or more of the at least one audiovisual effect corresponding to the first virtual setting based on the determined location of the user.

20 Claims, 12 Drawing Sheets

(56) References Cited

U.S. PATENT DOCUMENTS

| | | | | |
|---|---|---|---|---|
| 8,723,644 B2* | 5/2014 | Morehead | ............... | G08B 7/06 273/331 |
| 8,808,052 B2* | 8/2014 | Yang | ..................... | A63H 33/00 446/175 |
| 8,814,688 B2* | 8/2014 | Barney | ................. | A63H 30/04 446/484 |
| 9,039,482 B2* | 5/2015 | Cohen | ................... | A63H 30/04 446/175 |
| 9,582,072 B2* | 2/2017 | Connor | .................. | G06F 3/011 |
| 2010/0092930 A1* | 4/2010 | Fletcher | ............... | G09B 5/062 434/178 |
| 2012/0157197 A1* | 6/2012 | Watkins, Jr. | .......... | G06Q 10/00 463/30 |
| 2013/0065482 A1* | 3/2013 | Trickett | ................ | A63H 11/00 446/397 |
| 2013/0231029 A1* | 9/2013 | Katz | ..................... | A63H 30/04 446/454 |
| 2013/0303314 A1* | 11/2013 | Tackett | ................. | A63B 67/06 473/571 |
| 2014/0038137 A1* | 2/2014 | Hill | ........................ | G06F 3/016 434/62 |
| 2014/0080109 A1* | 3/2014 | Haseltine | ............... | A63F 13/06 434/308 |
| 2014/0349258 A1* | 11/2014 | Lore | .................. | G09B 19/0061 434/130 |
| 2015/0339952 A1* | 11/2015 | Glazer | .................. | G09B 23/24 434/298 |
| 2015/0364060 A1* | 12/2015 | Gupta | ................... | B25J 9/0081 434/118 |
| 2016/0035231 A1* | 2/2016 | Alva | ....................... | G09B 5/06 434/317 |
| 2016/0195369 A1* | 7/2016 | Perry | ........................ | F41J 7/04 434/19 |
| 2017/0019764 A1* | 1/2017 | Walden | ............. | G06Q 30/0261 |
| 2018/0038937 A1* | 2/2018 | Afzal | ................... | G01S 5/0252 |

* cited by examiner

STORYTELLING ENVIRONMENT: MAPPING VIRTUAL SETTINGS TO PHYSICAL LOCATIONS

BACKGROUND

Field of the Disclosure

The present disclosure generally relates to home entertainment, and more specifically to techniques for providing an immersive playtime environment using interactive devices.

Description of the Related Art

Computer graphics technology has significantly progressed since the first video games were developed. Relatively inexpensive 3D graphics engines now provide nearly photo-realistic interactive game play on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of the disclosure and are therefore not to be considered limiting of its scope, for the disclosure may admit to other equally effective embodiments.

DETAILED DESCRIPTION

Generally, embodiments presented herein provide techniques for creating an immersive storytelling environment using one or more storytelling devices (also referred to as interactive devices). More specifically, embodiments may use various storytelling devices, each capable of producing some auditory and/or visual effects, to create an immersive and interactive storytelling experience for a user. Such a system may include a variety of storytelling devices and a controller, connected via a network (e.g., a radio frequency (RF) communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audiovisual messages responsive to a certain stimulus event (e.g., a user performing a particular action), and to perform another action responsive to other stimulus (e.g., the user not performing the particular action within a predefined window of time). Generally, the controller may be one of the plurality of storytelling devices, or the controller could be a standalone device (e.g., a computing device executing a control application).

Exemplary Storytelling Device Implementations

Figure 1:
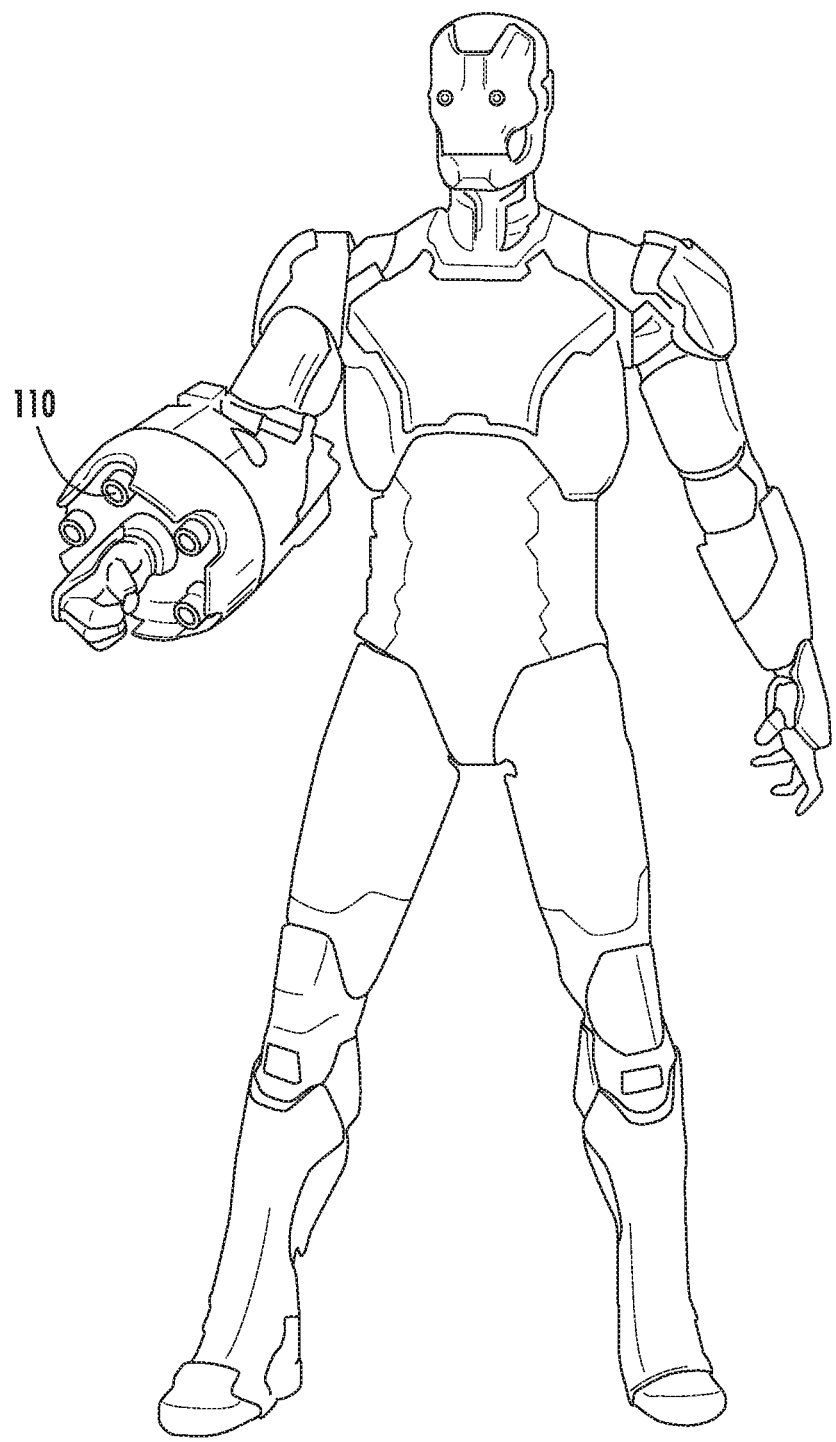
FIG. 1 illustrates a storytelling device, according to one embodiment described herein.

One embodiment provides interactive devices and techniques for providing an immersive play experience for users. For instance, one embodiment provides interactive action figures which are capable of performing actions and reacting to actions performed by other action figures or by a user. An example of such a device is shown in FIG. 1, which depicts an Iron Man® action figure configured to interact within an immersive play environment. For example, the Iron Man® action figure includes an infrared transmitter capable of transmitting coded infrared signals that simulates a blast from Iron Man's "repulsor ray." Generally, the coded infrared signals represent any infrared signals that include a data value(s) identifying the signal as pertaining to one of the interactive devices. In one embodiment, the signal is coded such that it identifies it originated from the Iron Man® type of action figure.

Figure 2:
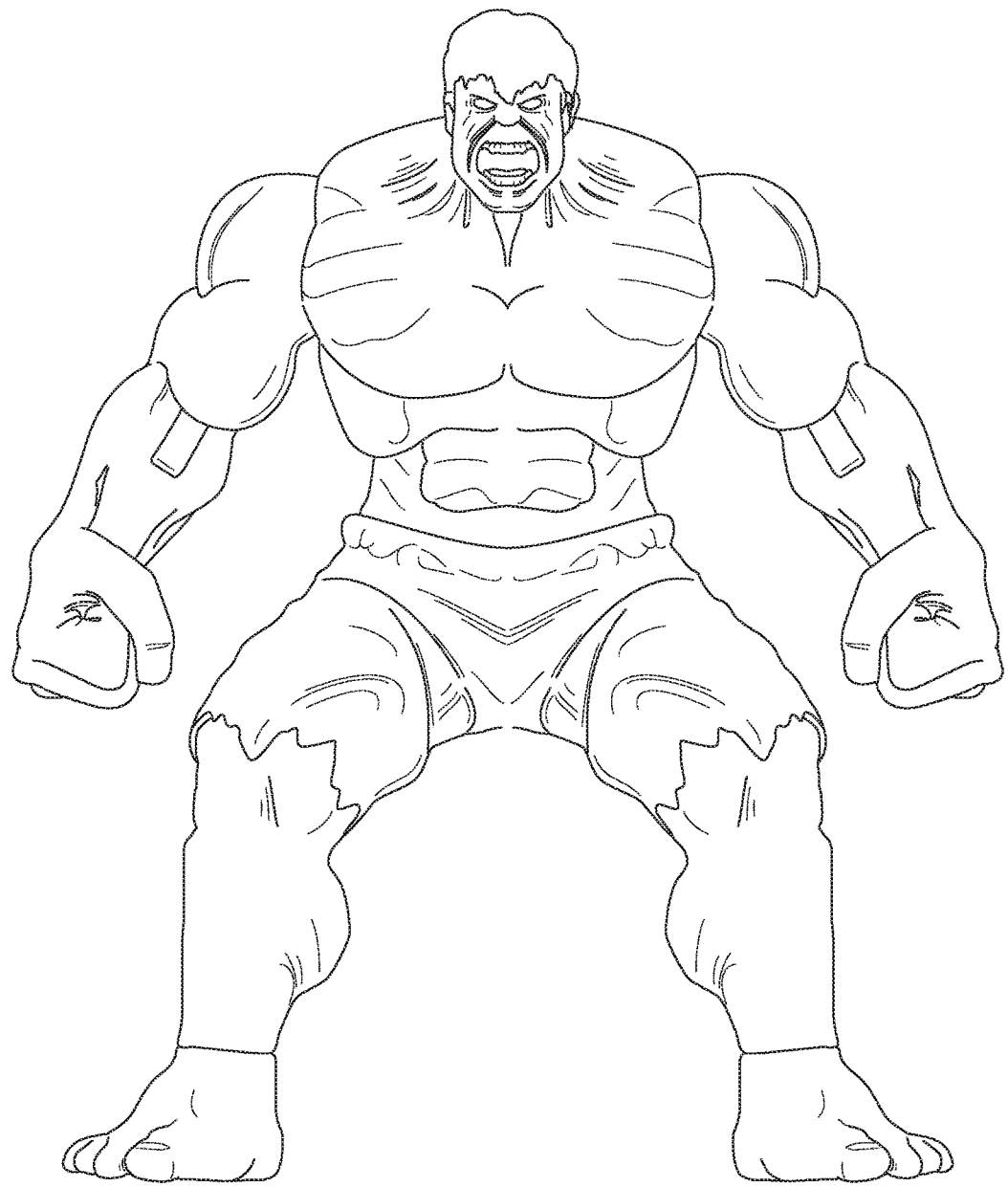
FIG. 2 illustrates a storytelling device, according to one embodiment described herein.

Other devices within the environment may receive these coded infrared signals and may react accordingly. For example, the Hulk® action figure shown in FIG. 2 could include an infrared receiver for detecting the infrared signal. Moreover, logic for the Hulk® action figure could then process the infrared signal and could determine that the signal represents a blast from Iron Man's repulsor ray. The logic could then perform an action in response to receiving the coded infrared signal. For example, the logic could update a state for the Hulk® action figure to indicate that a repulsor ray hit has been received. For instance, the Hulk® action figure could be configured to perform an action after receiving each repulsor ray hit, where the action is determined based on how many hits the action figure has already received. As an example, for the first repulsor ray hit, the Hulk® action figure could be configured to output a prerecorded roaring sound (e.g., using one or more speakers associated with the action figure). Upon receiving a second repulsor ray hit, the Hulk® action figure could be configured to manipulate its arms and head, in addition to outputting a roaring sound. After receiving a third repulsor ray hit, the Hulk® action figure could be configured to rock back and forth, and after receiving a fourth repulsor ray hit, the Hulk® action figure could be configured to fall over (i.e., to topple from an initial standing position) on the table.

Figure 3:
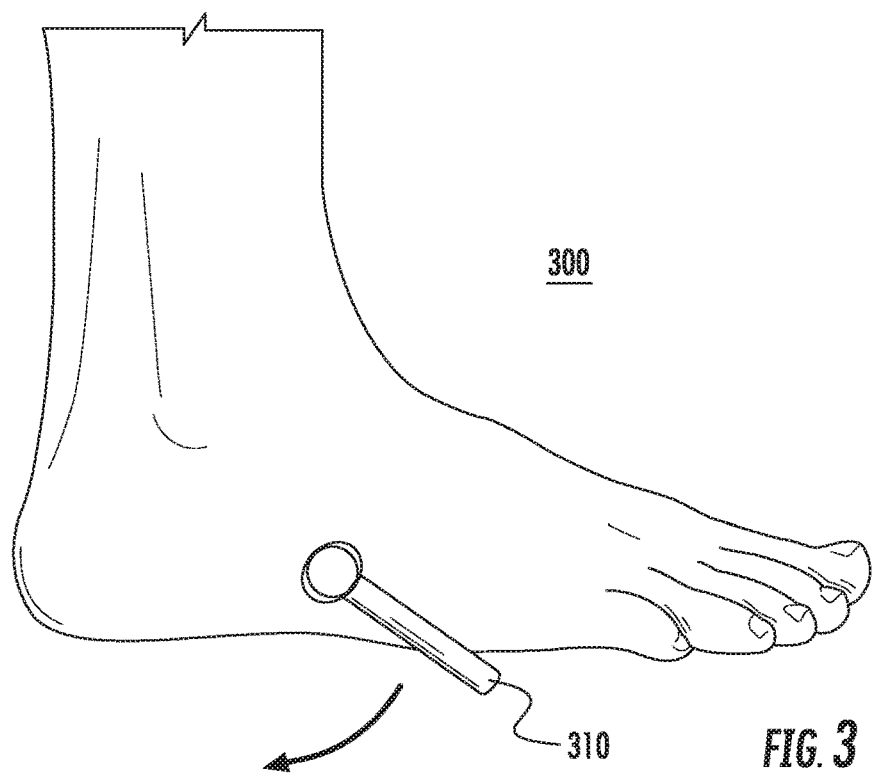
FIG. 3 illustrates a rotatable arm within a storytelling device, according to one embodiment described herein.

An example of such a rocking motion is shown in FIG. 3, which illustrates a foot of an action figure configured to perform a rocking motion. Here, the foot 300 includes a rotating arm 310 which, in its resting position, is even with (or above) the base of the foot. That is, the arm 310 can be positioned such that the foot will sit flat on the surface (e.g., a table top), allowing the action figure (e.g., the Hulk® action figure) to stand in a stationary position on the surface. The arm 310 may be attached to a servomechanism which provides the movement of the arm 310. In this embodiment, the arm 310 may be manipulated to move in the clockwise direction, causing the action figure to shift its position on the surface. The arm's 310 rotation could be controlled to manipulate the action figure's movement. For example, the arm 310 could be rotated in the clockwise direction slightly and then returned to the resting position in order to cause the action figure to rock back and forth on the surface. In one embodiment, rotating arms 310 within each foot of the action figure could alternate slight rotations, in order to cause the action figure to shift from one foot to the other. As another example, the arm 310 could be rotated substantially in the clockwise direction, in order to cause the action figure to fall over onto the surface. Of note, while the above examples relate to Marvel® themed action figures and reacting to incoming blasts from a repulsor ray, such examples are for illustrative purposes only and are without limitation. More generally, the rotating arm 310 could be used to introduce movement into any action figure or device, responsive to the action figure or device entering a certain state (e.g., upon receiving a predefined number of coded infrared signals).

Figure 4:
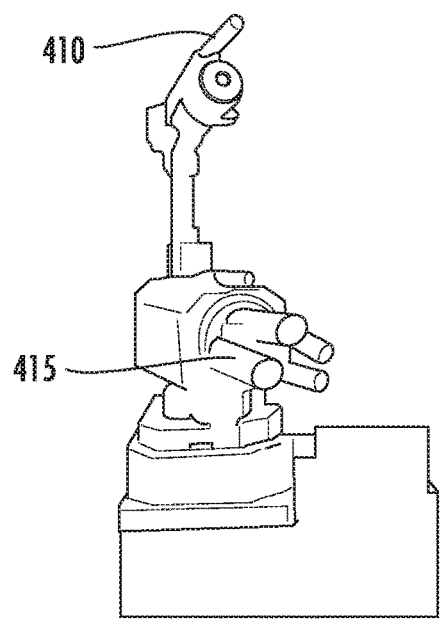
FIG. 4 illustrates a foam dart turret storytelling device, according to one embodiment described herein.

In addition to infrared signals, embodiments may interact with one another using physical projectiles. An example of such an embodiment is shown in FIG. 4, which illustrates a bore-sighted turret configured to fire foam darts. Here, the turret includes a bore-sighted video camera 410 and a number of foam darts 415. In the depicted embodiment, the camera 410 is positioned such that the camera 410 moves in conjunction with the orientation of the foam darts 415, allowing a user to see aim the foam darts 415 at a target. For example, the turret could be controlled using a software application (e.g., executing on a remote computing device), and the software application could output a video stream with a targeting reticule for use in aiming the foam darts 415. The foam darts 415 could be launched using a pneumatic apparatus. For example, each be mounted onto a hollow cylinder and, upon receiving a signal to fire one of the darts 415, the turret could shoot a burst of air into the corresponding cylinder, causing the dart 415 to launch. More generally, however, any device for aiming and launching projectiles may be used in accordance with the techniques described herein.

In one embodiment, the interactive devices are configured to detect and respond to hits from physical projectiles. For instance, the Hulk® action figure could be configured to detect and react to hits from the foam darts 415 (e.g., in a similar fashion to hits from the coded infrared signals representing repulsor ray blasts). For example, the Hulk® action figure could include an accelerometer and could be configured with logic to detect readings from the accelerometer matching a particular signature that corresponds to hits from the foam darts 415. That is, the accelerometer may produce a certain pattern of readings when the Hulk® action figure is struck with one of the foam darts 415, and the Hulk® action figure could be configured to determine that a foam dart has struck the Hulk® action figure upon detecting such a pattern of readings from the accelerometer. Advantageously, doing so allows the Hulk® action figure to react to hits from physical projectiles such as the foam darts 415, and further allows the Hulk® action figure to distinguish between general movements (e.g., a user handling the Hulk® action figure) and strikes from physical projectiles.

For instance, upon detecting accelerometer readings matching the signature of a foam dart strike, logic for the Hulk® action figure could cause the Hulk® action figure to output the roaring sound effect and to vibrate, simulating the action figure shaking with rage. In one embodiment, the vibration effect is achieved using a speaker within the action figure. For example, the speaker could produce a low frequency, high amplitude sound effect that causes the action figure to vibrate. Moreover, the action figure could be balanced such that the vibration causes the action figure to move in a particular way. For example, the Hulk® action figure could have an asymmetrical balance, such that more weight is to the rear of the toy (i.e., the Hulk® action figure's back) than is at the front of the toy (i.e., the Hulk® action figure's chest). When the Hulk® action figure then begins vibrating, the weight differential could cause the Hulk® action figure to move backwards.

For instance, upon detecting a strike from a foam dart, the Hulk® action figure could output a sound effect (e.g., a roaring sound) using a first speaker within the Hulk® action figure, and the Hulk® action figure could then begin vibrating using a second speaker, causing the Hulk® action figure to vibrate and move backwards on the surface (e.g., the table top). In one embodiment, a platform could be provided for the Hulk® action figure, such that when the Hulk® action figure move backwards for a sufficient distance through the use of the speaker, the Hulk® action figure could fall off the platform and fall over onto the surface (e.g., a table surface on which the platform is sitting). For example, the Hulk® action figure could be configured to move backwards a particular amount (i.e., through the use of speaker-induced vibration) responsive to each hit (e.g., detecting a coded infrared signal indicating a blast from Iron Man's® repulsor ray). As the Hulk® action figure moves backwards after each hit, the Hulk® action figure could fall off the platform after a certain number of hits, causing the Hulk® action figure to fall over. Advantageously, doing so provides a low cost way of introducing vibration and movement into a device, and provides a more realistic and immersive play experience as the Hulk® action figure appears to reel backwards and eventually fall over from the impact of foam darts and "repulsor ray" blasts.

Figure 5:
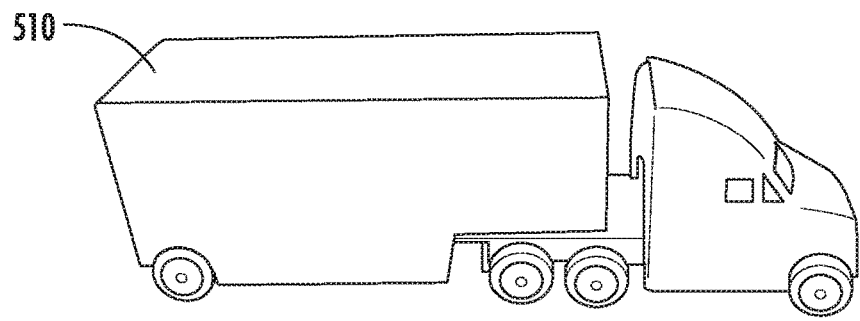
FIG. 5 illustrates an exploding vehicle storytelling device, according to one embodiment described herein.

Another example is shown in FIG. 5, which includes a toy vehicle 510. As shown, the toy vehicle 510 is assembled using a number of spring-loaded pieces, and includes a mechanism for releasing the spring-loaded pieces, causing the toy vehicle 510 to disassemble. For example, logic associated with the toy vehicle 510 could maintain a count of how many hits the toy vehicle 510 has sustained (e.g., hits from foam darts, hits from coded infrared signals, etc.), and upon the count exceeding a predefined threshold of hits, the toy vehicle 510 could trigger the mechanism to release the spring-loaded pieces, causing the toy vehicle 510 to appear to explode in response to the most recent hit (e.g., the toy vehicle 510 disassembling responsive to a strike from one of the foam darts 415). Additionally, such a trigger could be accompanied by lighting and/or acoustic effects in order to enhance the realism of the explosion. For example, the triggering of the mechanism could be accompanied by a speaker within the toy vehicle 510 could output an explosion sound effect, while lights within the spring-loaded pieces of the toy vehicle 510 flash. Advantageously, doing so creates the appearance of the toy vehicle 510 exploding, responsive to a particular event (e.g., a strike from a foam dart). Of note, while the depicted embodiment is a toy vehicle, it is broadly contemplated that the techniques described herein are not limited to vehicles and may be adapted to producing a visual response from any type of object.

Figure 6:
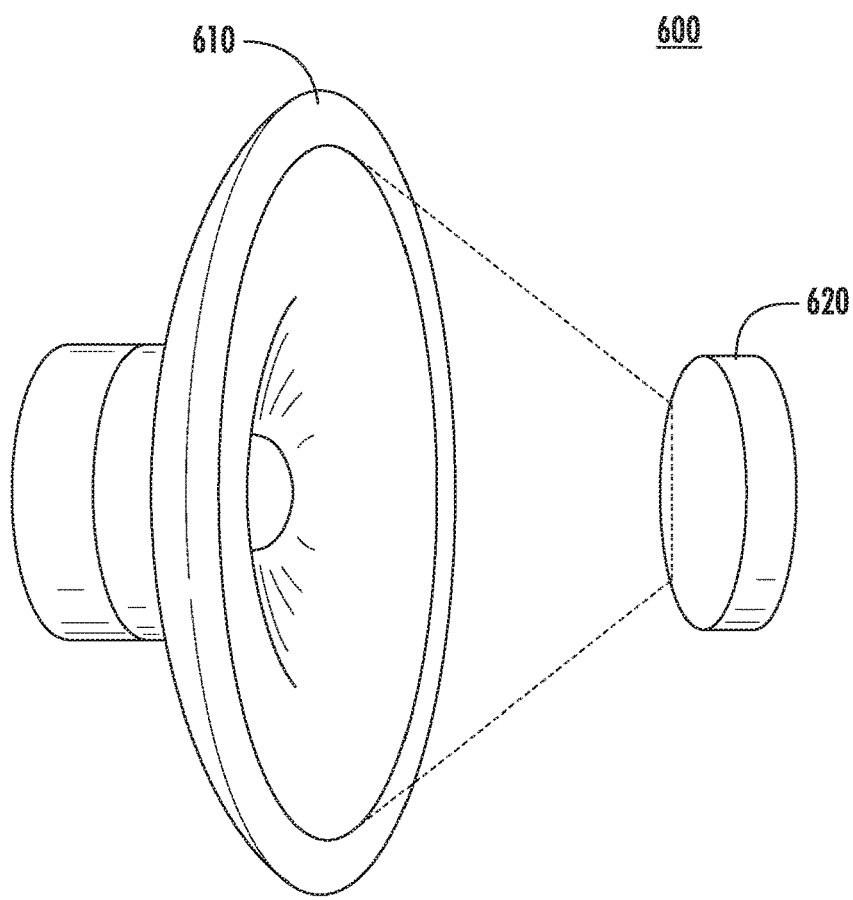
FIG. 6 illustrates an interaction between a speaker and a depressible mechanism, according to one embodiment described herein.

In one embodiment, a speaker within the toy vehicle 510 can be configured to trigger the mechanism that releases the spring-loaded pieces, causing the toy vehicle 510 to disassemble. An example of this is shown in FIG. 6, which shows a system 600 that includes a speaker 610 and a release mechanism 620. Here, the release mechanism 620 is positioned such that a diaphragm of the speaker 610 will depress the release mechanism 620, when sounds of certain frequencies and amplitudes are played through the speaker 610. For example, the release mechanism 620 could be depressed by the diaphragm of the speaker when low frequency, high amplitude sounds are played through the speaker 610. However, the playback of other sounds through the speaker 610 may not induce sufficient movement in the diaphragm to depress the release mechanism 620, allowing the speaker 610 to be used for multiple purposes (i.e., sound playback as well as release mechanism 620 activation).

Thus, for example, a user could control the turret shown in FIG. 4 using a software application and the bore-sighted camera device 410, and could launch the foam darts 415 at the vehicle 510. The vehicle 510 could detect hits from the foam darts by determining that readings from an accelerometer within the vehicle 510 match a predefined accelerometer signature corresponding to a physical projectile striking the vehicle 510. In response to detecting the vehicle 510 has received a number of hits exceeding a predefined threshold amount of hits, the vehicle 510 could cause the speaker 610 to emit a particular sound, such that the diaphragm of the speaker 610 depresses the release mechanism 620. In response to the release mechanism 620 being triggered, the spring-loaded parts that make up the vehicle 510 could be released, causing the vehicle 510 to disassemble and appear to explode. The vehicle 510 could also output an explosion sound and could trigger a number of light effects, further enhancing the explosion effect. Advantageously, doing so provides a fun and immersive playtime experience using the interactive devices.

Figure 7:
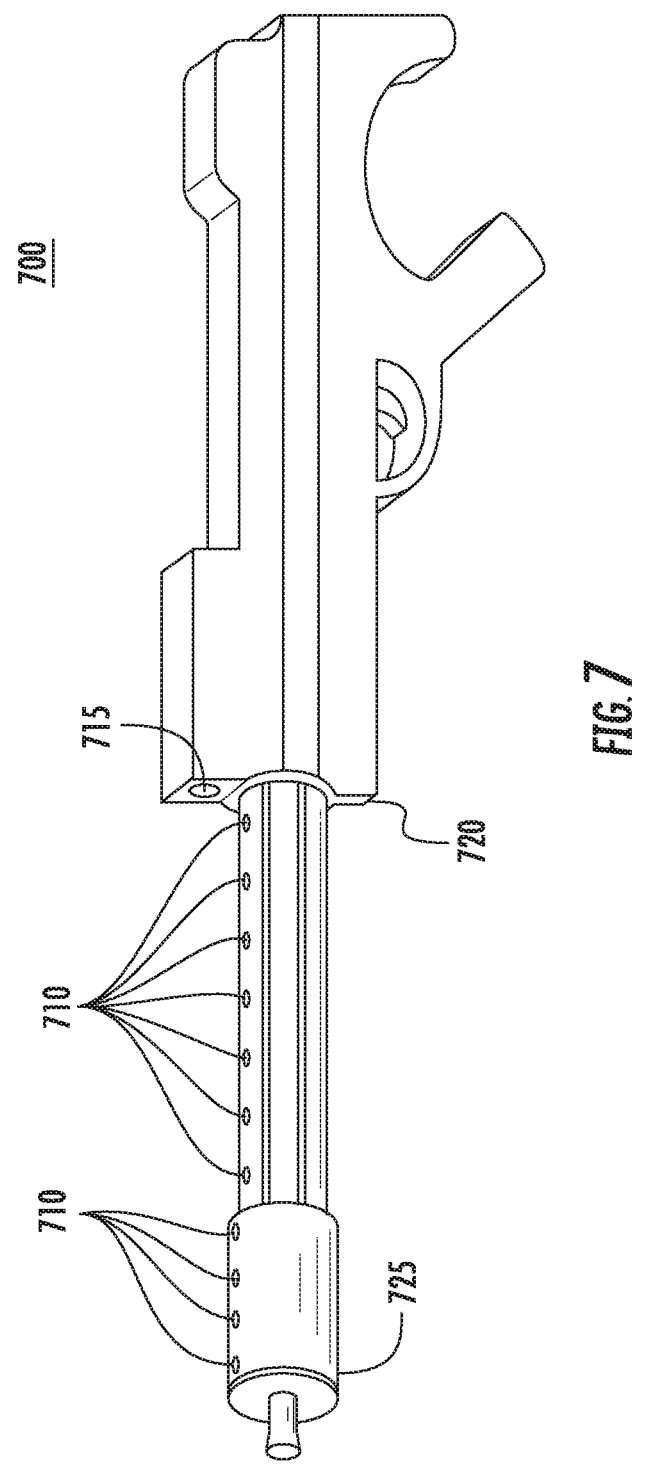
FIG. 7 illustrates a toy blaster storytelling device, according to one embodiment described herein.

In addition to interactions between the devices (e.g., the Hulk® action figure, the Iron Man® action figure, the exploding vehicle 510, etc.), the devices may be configured to interact with users as well. For example, a user could manipulate a toy blaster configured to "shoot" coded infrared signals and could interact with the interactive devices by firing the toy blaster at the devices (e.g., causing the Hulk® action figure to vibrate, causing the exploding vehicle 510 to vibrate and/or disassemble, etc.). An example of such a device is shown in FIG. 7, which illustrates a Star Wars® blaster toy 700 that includes an infrared emitter device 715 and a multitude of lights 710. The infrared emitter device 715 can be configured to transmit coded infrared signals in the direction the blaster rifle 700 is aimed, responsive to a user manipulating a trigger of the blaster rifle 700.

The lights 710 can be used to create an optical illusion of a "corpuscle" or beam of light traversing the air, so as to simulate a laser pulse gun effect (e.g., as in the movie Star Wars®). Generally, the lights 710 can be any devices adapted to emit light (e.g., a light emitting diode). Here, the blaster rifle 700 may illuminate the lights 710 in sequence, starting from the base-end 720 of the barrel and continuing to the muzzle-end 725 of the barrel, responsive to a user depressing the trigger device of the blaster rifle 700. By illuminating the lights in sequence, the blaster rifle 700 can produce an illusion of motion in a beam of light emitting from the rifle 700. Moreover, the speed at which the sequence of lights illuminates and the duration each light remains lit can be adjusted, depending on the visual effect desired. In one embodiment, the speed and the duration each light remains lit are equal, such that each light after the first light is illuminated as the previous light is extinguished. Additionally, the lights could be covered with a material adapted to disperse the light in order to enhance the visual effect (i.e., creating the visual effect of a "beam" of light, rather than a sequence of individual lights).

Figure 8:
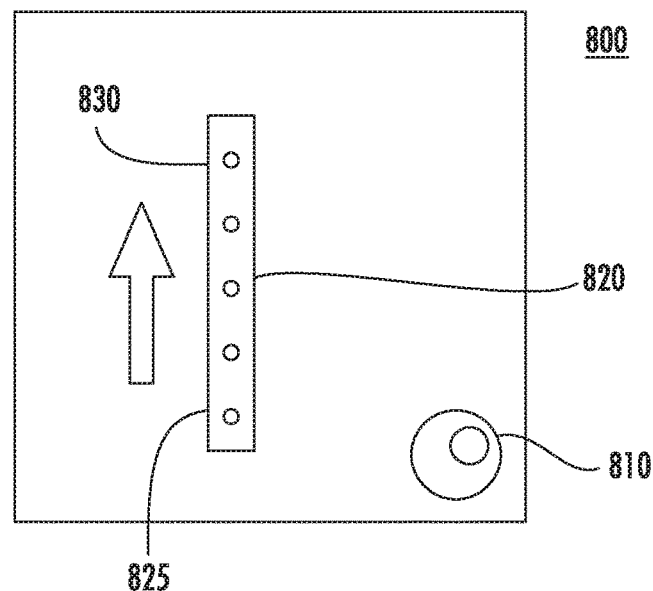
FIG. 8 illustrates a target storytelling device, according to one embodiment described herein.

As discussed above, a coded infrared signal can also be transmitted (e.g., using the transmitter 715), responsive to the user depressing the blaster rifle's trigger. In one embodiment, a target device is configured to receive such an infrared signal and, in response, to create a sequence of lights on the target device, in order to continue the optical illusion of the corpuscle or beam of light traversing the air. An example of such a target device is shown in FIG. 8, which illustrates a target device 800 configured with an infrared receiver 810 and a sequence of lights 820. The infrared receiver 810 could be configured to receive the coded infrared signal from the blaster rifle 700 and, in response, to initiate a sequence of illuminating the lights 820 in order to continue the optical illusion produced by illuminating the lights 710 in sequence. For example, the lights 820 could be illuminated in sequence from the bottom portion 825 to the top portion 830. Moreover, the speed at which the sequence progresses from one light to the next may be configured, depending on the visual effect desired. In one embodiment, each light in the sequence after the first is configured to illuminate when the previous light in the sequence is extinguished. Advantageously, by tying the sequences of lights 820 and 710 together, embodiments can create an illusion of motion for a "beam" of light emitting from the blaster rifle 700 and going into the target 800 (e.g., similar to the blasts of light in the Star Wars® movie franchise).

Figure 9:
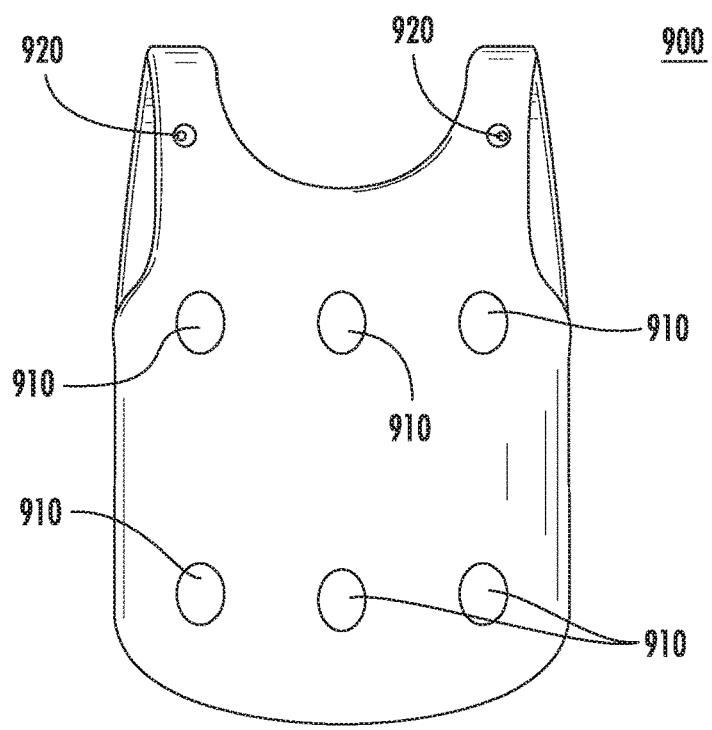
FIG. 9 illustrates a haptic feedback vest storytelling device, according to one embodiment described herein.

One embodiment provides a haptic feedback vest, configured to interact with the interactive devices described herein. An example of such a vest is shown in FIG. 9, which depicts a vest 900 configured with a plurality of speaker elements 910 and infrared receivers 920. In one embodiment, the vest 900 is configured with a sequence of lights, similar to the lights 820 on the target device 800. Such lights could be used to continue an optical illusion created by another device, such as the blaster rifle 700. Here, each of the speakers 910 is configured to emit a sound configured to produce a vibration (e.g., a low frequency, high amplitude sound), responsive to a trigger event.

For example, one of the infrared receivers 920 could receive a coded infrared signal from the blaster rifle 700, and logic for the haptic vest 900 could determine a direction from which the infrared signal was received. Generally, any technique for determining the blaster rifle's 700 position relative to the vest 900 may be used, consistent with the functionality described herein. The logic could then determine one or more of the speaker devices 910 oriented in the direction of the blaster rifle 700, and could cause the determined one or more speaker devices 910 to emit a sound configured to produce a vibration. Advantageously, doing so provides haptic feedback to the wearer of the vest, enhancing the realism of getting "shot" with the toy blaster. Similarly, the haptic vest 900 could provide haptic feedback (e.g., by causing one of the speakers 910 to vibrate) responsive to the vest 900 being struck by, for example, one of the foam darts 415 or by a coded infrared signal corresponding to the Iron Man® action figure's repulsor ray, and may provide the feedback using speakers oriented in the direction of the source of the strike (e.g., in the direction of the foam dart turret or the Iron Man® action figure). In one embodiment, the vest 900 additionally or alternatively provides haptic feedback using non-speaker devices, such as a vibration motor.

In a particular embodiment, the coded infrared signals may include type information and the vest 900 could use the type information to determine the appropriate haptic response for the received signal. For instance, the vest 900 could alter the duration, intensity, and/or number of speakers 910 used to provide haptic feedback for the signal, based on the type of the signal. For example, for an infrared signal of the "Star Wars® blaster rifle" type, the haptic vest 900 could trigger a brief vibration using one of the speaker devices 910 in the direction of the signal's source. As another example, for an infrared signal of the "foam missile" type (e.g., one of the foam darts 415), the vest 900 could simulate an explosion by triggering a longer duration vibration in a number of the speaker devices 910, in the direction from which the foam dart originated. As yet another example, for an infrared signal of the "repulsor ray" type (e.g., from the Iron Man® action figure), the vest 900 could simulate a sustained ray by causing one of the speakers 910 in the direction from which the signal was received to vibrate for a sustained period of time. Doing so helps to enhance the realism of the interactive play experience, as the user receives haptic feedback corresponding to the type of attack the user sustained.

While the above examples refer to a vest designed to provide haptic feedback to the wearer, such an example is provided for illustrative purposes only and without limitation. More generally, embodiments may be configured to provide haptic feedback with any sort of worn garment or article. Examples of such articles include body armor, helmets, dresses, gloves, shoes and so on. For instance, one embodiment provides a glove for use in controlling other objects and interactions, and such a glove may be configured to also provide haptic feedback to the user through the aforementioned techniques or analogous techniques.

For example, a glove could be configured as a radio-controlled (RC) vehicle controller and could be used to simulate a user having "force" powers in a Star Wars®-themed storytelling environment. For example, a force glove storytelling device could include sensors configured to detect the movement of the glove, and the glove could further include a transmitter device (e.g., a radio frequency (RF) transmitter) configured to transmit commands when predefined glove movements are performed. For instance, the toy vehicle 510 could be configured with an RF receiver for receiving commands from the force glove storytelling device. In such an example, the glove storytelling device could detect when the user points his hand wearing the force glove at the toy vehicle 510 with the user's fingers extended, and could transmit commands to control the movement of the toy vehicle 510 responsive to the movement of the user's hand. For instance, if the user moves his hand to the left, the toy vehicle 510 could be configured to drive in the direction of the hand movement (e.g., the leftward direction from the user's perspective), and the vehicle 510 could continue moving until the movement of the user's hand ceases. Moreover, haptic feedback could be provided to the user through the glove, e.g., through the use of one or more speakers configured to produce vibrations. For instance, such feedback could be provided as the user moves the toy vehicle 510, and could cease when the movement of the vehicle 510 ceases.

In addition to controlling the movement of other storytelling devices, such a force glove can be configured to control other actions of the other storytelling devices as well. For example, the glove storytelling device could detect when the user points the hand wearing the force glove at the toy vehicle 510, and upon detecting the user has clinched his first wearing the force glove (i.e., a predefined action has been performed), could trigger the exploding mechanism (e.g., the mechanism shown in FIG. 6) to cause the toy vehicle 510 to explode into a number of pieces (i.e., a predefined response corresponding to the performed action). Doing so provides a fun and intuitive way for remotely controlling the storytelling devices. Additionally, haptic feedback could be provided through the glove as the vehicle is exploding, further enhancing the storytelling experience.

Distributed Storytelling Environment

Figure 10:
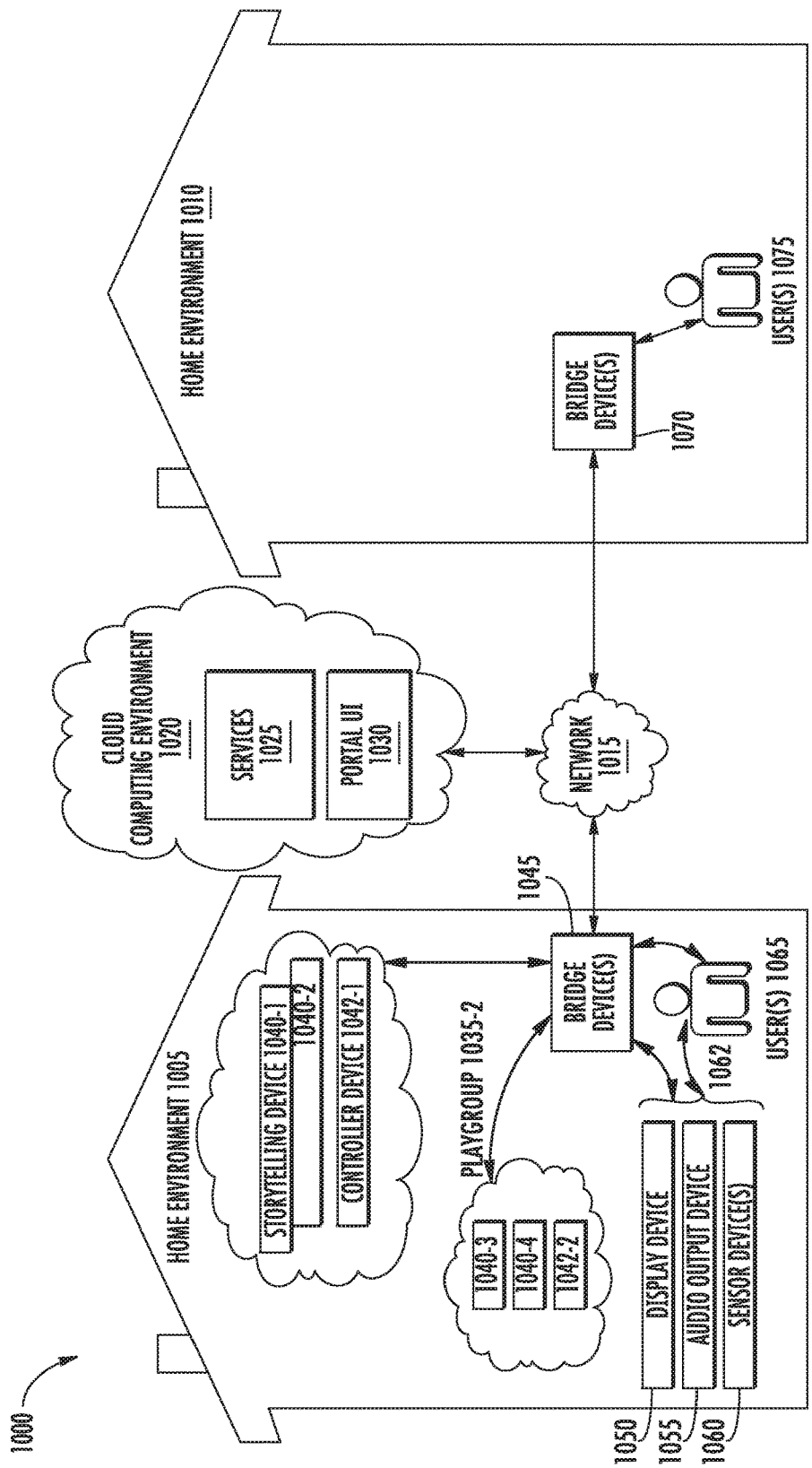
FIG. 10 illustrates a distributed storytelling environment comprising home environments at remote physical locations, according to one embodiment described herein.

FIG. 10 illustrates a distributed storytelling environment comprising home environments at remote physical locations, according to one embodiment described herein. As shown, the environment 1000 includes a cloud computing environment 1020 and home environments 1005, 1010, all of which are interconnected via a network 1015. The cloud computing environment 1020 hosts a plurality of services 1025 and a portal user interface (UI) 1030. The home environment 1005 includes two playgroups 1035-1, 1035-2 that include a plurality of storytelling devices 1040 (i.e., storytelling devices 1040-1, 1040-2, 1040-3, 1040-4, etc.), as well as one or more user(s) 1065 and one or more bridge device(s) 1045. Here, the user(s) 1065 may connect with the bridge device 1045 via a software application (e.g., executing on a mobile device, rendered within a web browser, etc.).

Generally, cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access information and the services 1025 from any computing system attached to a network connected to the cloud (e.g., the Internet).

Each playgroup 1035 generally represents a set of storytelling devices 1040 involved in a unique storytelling or playtime experience. For instance, a first playgroup 1035 represents a science fiction-themed storytelling experience and includes a light sword storytelling device 1040, an action figure controller storytelling device 1040, and a trainer storytelling device 1040. Likewise, the playgroup 1035 also represents a science fiction-themed storytelling experience and includes a light sword controller storytelling device 1040 and an action figure storytelling device 1040. More generally, however, the playgroups may contain any number of storytelling devices 1040 of any number of different themes and types.

Generally, the playgroups 1035 include storytelling devices that are located within a particular physical location (e.g., a room within the house environment 1005). That is, it may be preferable for a storytelling experience to only interact with storytelling devices within its immediate physical proximity (e.g., within the same room), as to do otherwise can potentially create security and other problems during the storytelling experience. A number of different techniques may be used to determine which storytelling devices are within immediate physical proximity of one another. For example, one or more of the storytelling devices 1040 could emit a first signal (e.g., an infrared signal) and the other storytelling devices 1040 could be configured to transmit a response (e.g., a radio frequency signal (RF)) upon receiving the first signal. The storytelling device(s) could then receive the responses from the other storytelling devices and could form a playgroup 1035 that includes the other (responding) storytelling devices 1040 as well as the one or more (emitting) storytelling devices.

Generally, it is advantageous for at least one of the first signal and response signal to be transmitted using a technique that does not readily pass through barriers such as the walls of a house (e.g., emitting infrared light), so as to detect only nearby storytelling devices that are within the same physical environment as the storytelling device. That is, while particular signals (e.g., RF signals) may be suited for inter-device communications, these signals may not be ideal for detecting nearby storytelling devices as they may readily permeate through barriers such as the walls of the house. Doing so helps to ensure that a storytelling experience will not make use of storytelling devices in different rooms of a residence or potentially within different residences altogether.

Certain storytelling devices 1040 can be designated as controller devices within each playgroup 1035. For example, controller device 1042-1 (generically, controller device 1042) corresponds to playgroup 1035-1, and controller device 1042-2 corresponds to playgroup 1035-2. Generally, a controller device 1042 configures each of the storytelling devices 1040 within a playgroup 1035 to perform certain actions in response to a detected stimulus event and within a current context of the story being told. Here, the story may include a number of different contexts in a temporal order, and the playback of the story may advance from one context to the next until the last context is reached and the storytelling experience is complete. However, while the story may be linear in progression, this is not necessary. For example, a story could have different branches, where the story can proceed down one of many possible arcs. For instance, arcs could be randomly selected, selected based on a user's request (e.g., the user specifying which arc should be taken), selected based on the user's actions (e.g., the user manages to "rescue" one of the fictional characters in the story), selected based on the user's history of actions (e.g., whether the user is trending towards the "dark side" in a science fiction storyline), and so on. Moreover, the story may be modified dynamically during playback based on various actions, such as one of the storytelling devices 1040 becoming unavailable (e.g., losing power, leaving the physical environment, etc.) or a new storytelling device 1040 being introduced to the environment (e.g., the user's friend comes over to play or initiates a remote play session, bringing one or more new storytelling devices 1040). Further, and according to various embodiments described herein, the contexts of a story may be assigned to specific physical regions of the home environment 1005. A particular context to be presented during playback may be selected based on a determined location of the user 1065 relative to one or more of the assigned physical regions.

Additionally, the controller device 1042 may maintain state information and control game logic for the playgroup 1035. For example, a first playgroup 1035 could be playing out a story in which a user is asked by the action figure storytelling device 1040 to deflect virtual laser beams fired from the trainer storytelling device 1040, using the light sword storytelling device 1040. Here, the elected controller device (e.g., action figure storytelling device 1040) could maintain a "hit points" value for the user that is decremented when the user fails to deflect one of the virtual lasers, and could further maintain a count of how many virtual laser beams the user has deflected thus far. Additionally, the controller could retrieve state data for the user (e.g., by querying one of the cloud-based services 1025 with an identifier for the user) and could use the user state data to adjust the playback of the story.

In addition to detecting nearby storytelling device within the same physical environment, the storytelling devices 1040 within a playgroup 1035 may elect one of the storytelling devices 1040 to operate as a controller device 1042. A number of different techniques may be used for such an election. For example, a user could explicitly specify that a particular one of the storytelling devices 1040 (e.g., the user's favorite device) should be used as the controller device 1042. Here, it may be preferable for the user to select a controller device 1042 that will remain with the user throughout the storytelling experience, so as to avoid a subsequent controller election partway through playback of the story. In one embodiment, the controller device 1042 may be elected based on technical specifications and properties of the storytelling devices 1040. For example, a storytelling device 1040 with a substantial amount of memory, processing power, and communication bandwidth may be preferable as the controller device 1042, relative to a storytelling device 1040 having a lesser amount of computing resources.

As discussed above, the story may generally include stimulus events and corresponding actions, and may be linear in progression or dynamic (e.g., a story that includes different story arcs or branches). In one embodiment, the story may be defined such that each corresponding action is attributed to a type or role of storytelling device (i.e., as opposed to a specific storytelling device). In mapping the story to the available and compatible storytelling devices 1040, the controller device 1042 could determine a type of each of the storytelling devices, and could assign particular stimulus events and corresponding actions to each of the storytelling devices based on the determined type. For example, a particular story could state that an action should be performed by a storytelling device having the role of "Hero," and the controller device 1042 could map the action onto a storytelling device within the playgroup having the role "Hero."

For instance, assuming that the storytelling device 1040 represents a first fictional character action figure, the controller device 1042 could assign any stimulus events and actions within the story that are specific to the fictional character to the action figure storytelling device 1040. Likewise, if the story includes any stimulus events and actions designated for a hero-type character in the science fiction universe, the controller device 1042 could assign these stimulus events and the corresponding actions to the storytelling device 1040 as well. In the event multiple storytelling devices 1040 are available that satisfy the criteria for a stimulus event/action combination (e.g., multiple hero devices are present and available within the playgroup), the controller device 1042 could select one of the storytelling devices 1040 to perform each of the stimulus event/action combinations. The controller device 1042 could use a number of different techniques for mapping the actions to the compatible devices, including a random mapping algorithm, a load balancing algorithm (e.g., round robin), user preferences (e.g., assigning more actions to a storytelling device 1040 that the user has identified as his favorite), explicit user instructions (e.g., allowing a user to customize the story, such as selecting which character will narrate the story), and so on. Advantageously, dynamically mapping the story onto the available and compatible storytelling devices 1040 allows the story to be used with various different storytelling devices and combinations of storytelling devices.

In one embodiment, the story may specify a distinct, contextually appropriate action to perform for various types of storytelling devices for a given stimulus event. That is, the controller device 1042 could determine that a particular story includes a stimulus event designated for a hero character, and could specify a corresponding action designated for an action figure storytelling device 1040 and a separate, distinct action designated for a different hero character-based storytelling device 1040. In such an embodiment, upon selecting one of the devices to respond to the stimulus event, the controller device 1042 could assign the corresponding action to the device based on the device's type. Doing so helps to create a more immersive and realistic storytelling experience for the user, as the storytelling devices 1040 can be configured to react to stimulus events in a manner appropriate for the represented fictional character.

Once the controller maps the story onto the devices, the controller configures each of the storytelling devices with a number of stimulus events and corresponding effects relating to a first context of the story. As an example, the action FIG. 1040 could detect when the user has successfully deflected a virtual laser beam fired from the storytelling device 1040 (i.e., an occurrence of the stimulus event), and could audibly congratulate the user in response (i.e., performing the corresponding effect).

As discussed above, in addition to defining roles associated with each stimulus event, the story may also define a corresponding action to be performed in response to the stimulus event. For instance, the story could explicitly define dialogue to be audibly output by a storytelling device 1040 matching the defined role. In one embodiment, the story defines a class of action that should be performed by a storytelling device 1040, in response to a corresponding stimulus event.

Home environment 1005 also includes one or more sensory output devices with which the user 1065 interacts to enhance the immersive nature of the storytelling experience. As shown, home environment 1005 includes a display device 1050 and audio output device 1055, but may include other sensory output devices such as haptic devices. The sensory output devices may be located at any suitable location within the home environment 1005, such as at fixed locations, movable, body-worn or carried by the user 1065, and so forth. As described above, the sensory output devices may be included with various storytelling devices 1040 or may be separate from the storytelling devices. The display device 1050 and audio output device 1055 are coupled with the bridge device 1045 and configured to present information relating to selected contexts of the story during playback. In this way, the display device 1050 and/or audio output device 1055 can be used to establish distinct virtual settings (or environments, scenes, etc.) within the storytelling experience as the user 1065 moves throughout the home environment 1005.

The display device 1050 may include visual displays of any suitable type. Some non-limiting examples of display device 1050 implemented using current display technologies include computer monitors, televisions, and integrated displays such as laptop screens, tablet screens, mobile phone screens, and so forth. Other non-limiting examples of display device 1050 include holographic or other three-dimensional (3D) displays. The display device 1050 may be integrated with the bridge device 1045 or may be separate. In some cases, the display device 1050 may be integrated in a body-worn or carried device, such as a lenspiece through which the user 1065 views the physical home environment 1005 during the storytelling experience.

In some cases, the display device 1050 may generate depictions of visual elements of the selected setting for the story as part of an augmented reality (AR) or a virtual reality (VR) display. For AR display implementations, the display device 1050 of home environment 1005 may overlay depictions of the visual elements of the setting onto the field of view of the user 1065 based on a determined position of the user 1065, a determined orientation of the user 1065, etc. within the home environment 1005.

Further, the home environment 1005 may include one or more sensor devices 1060 such as visual (e.g., sensing visible and/or infrared (IR) wavelengths) sensors whose sensed data can be used to determine position information for local storytelling devices 1040 and/or users 1065. Other non-limiting examples of sensor devices 1060 include inertial measurement units and navigation devices. The sensor devices 1060 may be included with or separate from the display device 1050, the bridge device 1045, and the storytelling devices 1040. For example, a body-worn device 1062 may include the display device 1050 (e.g., including a lenspiece), the audio output device 1055, and a visual sensor device 1060 that is oriented to capture data representing the field of view of the user 1065 at various times during the storytelling experience.

In some embodiments, the storytelling experience may be extended to include storytelling devices 1040 at a remote location, such as the home environment 1010. Home environment 1010 includes one or more storytelling devices 1040 (not shown), one or more user(s) 1075, and one or more bridge device(s) 1070 coupling the storytelling devices with the network 1015. The display device 1050 may be further configured to display information relating to remotely-located storytelling devices 1040 (e.g., at home environment 1010). The ability to depict—and to interact with—remotely-located storytelling devices 1040 enhances the immersive playtime experience for users 1065, 1075, giving the users 1055, 1070 the perception of playing together though located remotely.

In addition to merely viewing depictions of remotely-located storytelling devices 1040, in various embodiments users 1065, 1075 may interact with the depictions within the storytelling experience. For example, input data acquired by the sensor devices 1060 may be used to determine an interaction of the users 1065 with one or more depicted storytelling devices 1040. In some cases, visually determining that the user 1065 has shifted focus from a local storytelling device 1040 to a position consistent with a depiction of a remotely-located storytelling device 1040 can indicate that the user 1065 wishes to interact with the depicted storytelling device. In some cases, the location and/or orientation data for a local storytelling device 1040 may be determined from input data from sensor devices 1060. Predetermined changes to the location and/or orientation data of the local storytelling device 1040 (e.g., movements caused by a user 1065 during the storytelling experience) relative to a depiction of a remotely-located storytelling device 1040 can indicate that the user 1065 wishes to interact with the depicted storytelling device. For example, a body-worn repulsor ray device may be raised by a user 1065 during play and "aimed" at the depicted storytelling device 1040.

The display device 1050 is configured to display animation sequences and/or other visual effects relating to the depicted storytelling devices 1040. Additionally or alternatively, the audio output device 1055 is configured to produce audio effects that can accompany the displayed animation sequences and/or other visual effects. Some of the animation sequences/effects can be performed responsive to local or remote user input with the depicted storytelling devices 1040. The animation sequences/effects may include audio-visual elements consistent with the predetermined actions that are performed by the storytelling devices 1040. For example, upon detecting a repulsor ray or projectile hit at a first storytelling device 1040, the depiction of the first storytelling device may be animated to illustrate the projectile hit as well as the resulting reaction of the storytelling device. Continuing an earlier example, say a Hulk® action figure is one storytelling device 1040 included in the home environment 1010. The Hulk® action figure is also depicted using the display device 1050 of home environment 1005. Upon detecting a first hit, the depiction of the Hulk® action figure on display device 1050 could be animated to show the action of roaring, corresponding to the prerecorded roaring sound produced by the action figure itself. Further, the audio output device 1055 may be used to produce a roaring sound to accompany the roaring animation.

While the animations sequences/effects may depict the same predetermined physical actions performed by the corresponding storytelling device 1040, the animations sequences/effects need not be limited to those actions. The depicted animations can be more richly detailed and thus appear more realistic than the relatively limited mechanical movements of the storytelling devices 1040, which helps to enhance the immersive nature of the storytelling environment. Further, according to various embodiments described herein, the animation sequences/effects that are used for depictions of storytelling devices 1040 may be at least partially synchronized with actions that are performed locally by the storytelling devices 1040, so that users 1065, 1075 at remote locations perceive a unified, cohesive play environment.

In some embodiments, the interaction of users 1065, 1075 with depictions of remotely-located storytelling devices 1040 can be used to trigger physical actions of the storytelling devices 1040. For example, after sighting in on a depiction of a remote storytelling device 1040, the user 1065 uses a local storytelling device 1040-1 (e.g., a body-worn repulsor ray blaster) to fire a repulsor ray at the depiction. Related data from the local storytelling device 1040-1 causes an animation sequence/effects to be displayed on the local display device 1050, and further causes a physical action to occur at the storytelling device 1040 at the home environment 1010, consistent with receiving a repulsor ray hit from local users 1075.

Figure 11:
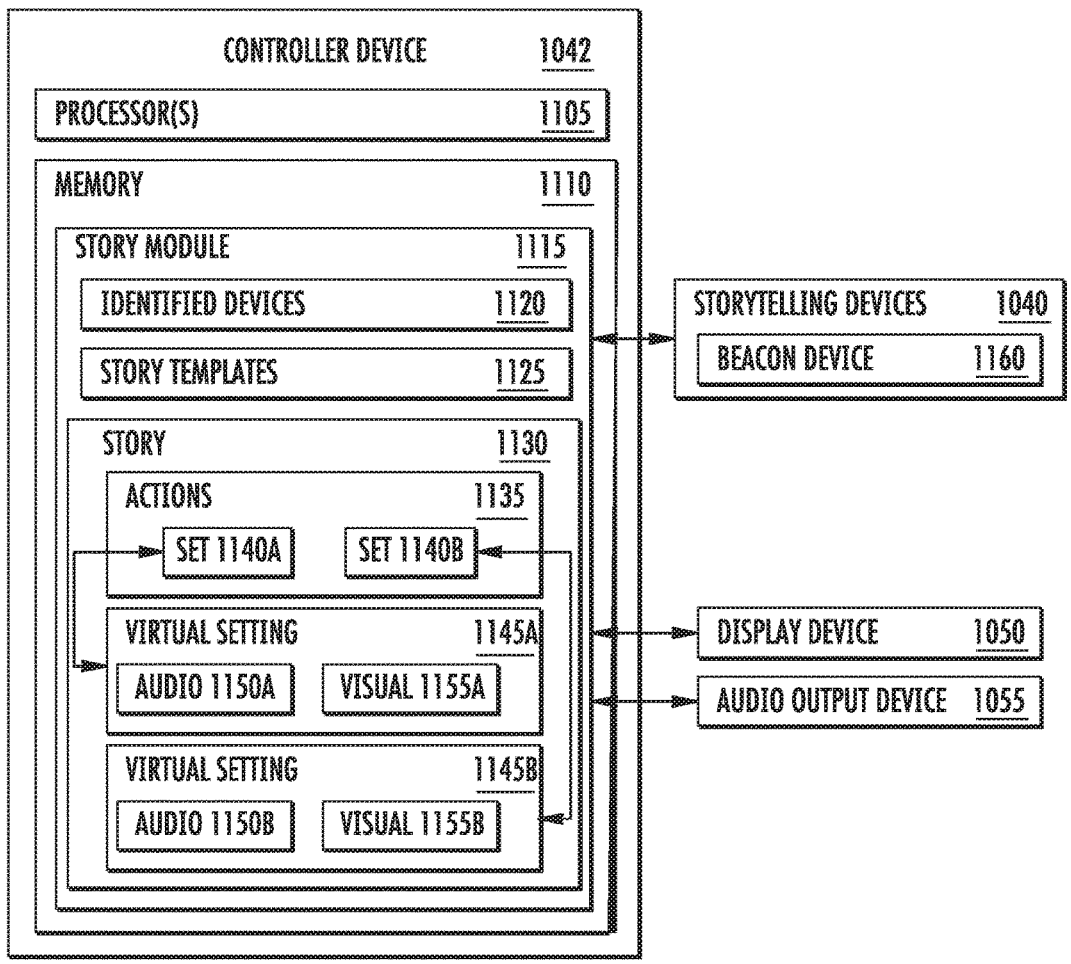
FIG. 11 illustrates an exemplary arrangement configured to control production of audiovisual elements for a virtual setting within a storytelling experience, according to one embodiment described herein.

FIG. 11 illustrates an exemplary arrangement 1100 configured to control production of audiovisual elements for a virtual setting within a storytelling experience, according to one embodiment described herein. Generally, the arrangement 1100 produces different audiovisual elements related to a virtual setting based on determined user locations during playback of a story. "Audiovisual elements," as used herein, is intended to encompass the production of audio-only elements (e.g., prerecorded sounds, generated speech, etc.), visual-only elements (e.g., video, graphics, lighting effects, etc.), combinations of audio and visual elements, as well as elements provided through other sensory outputs such as haptics, whether the other sensory outputs are separate from audio and visual elements or in combination. In some embodiments, the arrangement 1100 associates different virtual settings with different physical locations within the home environment, e.g., by assigning a beacon device to form a region associated with a particular virtual setting.

The arrangement 1100 comprises controller device 1042 communicatively coupled with one or more storytelling devices 1040, a display device 1050, and an audio output device 1055. Although not shown, controller device 1042 may be further coupled with one or more other sensory output devices, such as haptic devices. Alternately, some or all of the functionality of controller device 1042 described herein may be performed by a bridge device coupled with the controller device 1042. As discussed above, the controller device 1042 generally configures each of the storytelling devices 1040 within a playgroup 1035 to perform certain actions in response to a detected stimulus event and within a current context of the story being told.

Processor 1105 retrieves and executes programming instructions stored in the memory 1110. Processor 1105 is included to be representative of a single central processing unit (CPU), multiple CPUs, a single CPU having multiple processing cores, graphics processing units (GPUs) having multiple execution paths, and the like. The memory 1110 is generally included to be representative of a random access memory, but may further include non-volatile storage of any suitable types.

Memory 1110 generally includes program code for performing various functions related to generating and maintaining the storytelling environment. Within memory 1110, the story module 1115 is generally configured to generate a story 1130 using a selected one of a number of predetermined story templates 1125, and based on a number of identified storytelling devices 1040 (i.e., identified devices 1120) that are available for participating in the storytelling experience.

The storytelling devices 1040 included in the identified devices 1120 may be identified by the controller device 1042 using a registration process performed by any suitable methods of communication. One non-limiting example discussed above includes the controller device 1042 emitting a first signal such as an infrared (IR) signal, and other storytelling devices 1040 transmitting a response signal such as a radio frequency (RF) signal in response to receiving the first signal.

Generally, a story 1130 may be generated by mapping predetermined actions 1135 associated with a selected story template 1125 to the available identified devices 1120. For example, a particular story template 1125 can specify an initial mapping of storytelling device roles to specific actions 1135, and the controller device 1042 maps those actions 1135 onto available storytelling devices 1040 that match the specified roles. For example, if the controller device 1042 determines that several movie-themed storytelling devices 1040 are available in the identified devices 1120, the controller device 1042 could select a story template 1125 relating to the movie theme for use in generating the story 1130. Other factors may influence generation of a story 1130, such as user input. For example, a user could directly select a story 1130 to be generated and played back, or the user could indicate that a particular storytelling device 1040 should be prominent throughout a story 1130.

The generated story 1130 includes one or more virtual settings 1145A, 1145B (generically, virtual setting(s) 1145) that each define a time, a location, and/or conditions in which the story 1130 takes place. For example, virtual setting 1145A could represent an indoor environment of a building, while virtual setting 1145B is an outdoor environment adjacent to the building. The virtual settings 1145 need not be spatially connected, however. In some embodiments, the virtual settings 1145 represent different scene settings selected from movies, television shows, video games, or other media. The user(s) may be familiar with these scene settings from previous exposure to the media, and building the storytelling experience using familiar virtual settings 1145 may enhance the immersive nature of the storytelling environment. In other words, the user(s) tend to feel more integrated into the storytelling experience when the various actions 1135 of the story 1130 are perceived as being performed within the virtual setting 1145, and not merely the physical home environment in which the user(s) and storytelling devices are located.

The virtual setting(s) 1145 may be specified by the selected story template 1125 or can be otherwise selected or generated by the story module 1115. Each virtual setting 1145 can be associated with particular actions 1135 of the story 1130. As shown, virtual setting 1145A corresponds to a set 1140A of one or more of the actions 1135, and virtual setting 1145B corresponds to a set 1140B of one or more of the actions 1135. In one embodiment, the sets 1140A, 1140B include at least one overlapping action 1135 that is applicable to both virtual settings 1145. For example, one non-limiting overlapping action 1135 could be a storytelling device 1040 generating predetermined speech phrases responsive to the controller device 1042 determining that the user is carelessly handling a light sword storytelling device 1040, an action 1135 that may be appropriate regardless of the virtual setting 1145. In other embodiments, the sets 1140A, 1140B include no overlapping actions 1135.

Each virtual setting 1145 is associated with one or more audio elements 1150 and/or one or more visual elements 1155, which when presented by the corresponding display device 1050 or audio output device 1055, enhance the immersive nature and realism of the storytelling environment. Each virtual setting 1145 may further include other sensory outputs, such as haptics.

Some non-limiting examples of audio elements 1150 include ambient noise, music, dialogue between characters, etc. that is characteristic of the virtual setting 1145 being portrayed. Some non-limiting examples of visual elements 1155 include structures, decorations, characters, etc. that are characteristic of the virtual setting 1145 being portrayed. The audio elements 1150 and visual elements 1155 may be prerecorded and stored in memory 1110 or in a non-volatile memory such as storage, and/or generated based on predetermined data from memory 1110 or the storage (e.g., predetermined text for speech generation).

In some embodiments, the arrangement 1100 associates different virtual settings 1145 of the story 1130 with different physical locations within the home environment. One or more storytelling devices 1040 may include a beacon device 1160 which the controller device 1042 assigns to a particular virtual setting 1145. Generally, the beacon device 1160 is configured to transmit and/or receive signals of any suitable type (such as RF signals and optical signals) in order to determine user location 1165 during the playback of the story 1130. The user location 1165 or sequence of user locations 1165 may be used to adaptively control the audio-visual elements (corresponding to particular virtual settings 1145) that are being produced by the display device 1050 and/or the audio output device 1055. Thus, as the user moves throughout the home environment, he or she will encounter different virtual settings 1145 within which portions of the story 1130 take place. Additional structural details of the beacon device 1160 are discussed in FIG. 12D.

Figure 12A:
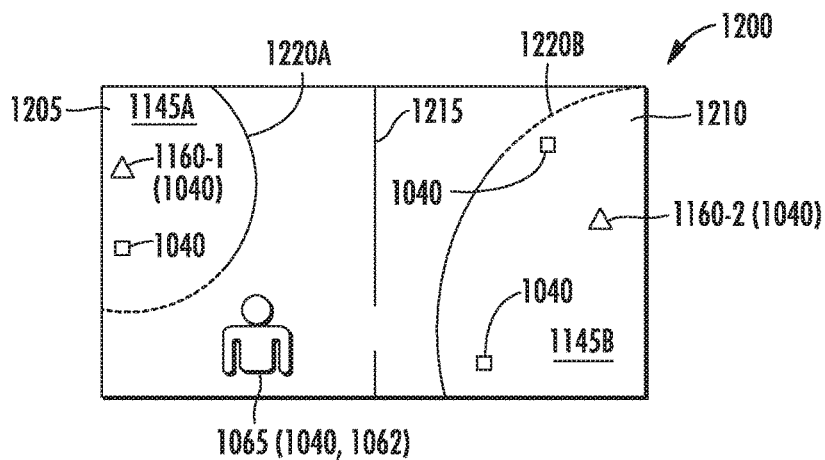
FIG. 12A illustrates a spatial mapping of a storytelling environment within a home environment, according to one embodiment described herein.

FIG. 12A illustrates a spatial mapping of a storytelling environment within a home environment, according to one embodiment described herein. More specifically, FIG. 12A depicts a top-down plan view 1200 of the storytelling environment.

Plan view 1200 depicts two adjacent rooms 1205, 1210 of the storytelling environment that are defined by a wall 1215. Located within room 1205 are user 1065, a storytelling device 1040, and a first beacon device 1160-1 (which may also be a storytelling device 1040). The user 1065 may have a body-worn device 1062 (or carried device) and/or a storytelling device 1040. Located within room 1210 are a plurality of storytelling devices 1040 and a second beacon device 1160-2.

The controller device (not shown) has assigned the virtual setting 1145A to the first beacon device 1160-1 and virtual setting 11456 to the second beacon device 1160-2 to produce audiovisual elements associated with the virtual setting 1145A, 11456 based on the location of the user 1065. Each beacon device 1160-1, 1160-2 has an associated detection range illustrated as range limits 1220A, 1220B, within which the user 1065 may be detected during playback of the story. The sizes and shapes of the detection ranges may vary on a number of factors: the particular technique used to detect the user 1065, the power of a transmitter of the beacon device 1160, the sensitivity of a receiver of the beacon device 1160, the presence of other objects in the room (whether actively or passively interfering), the power of a transmitter of the storytelling device 1040, and so forth.

As shown, user 1065 is located outside the detection ranges of each beacon device 1160-1, 1160-2. In some embodiments, the controller device causes no audiovisual elements for a particular virtual setting 1145A, 11456 to be produced based on the user location. In another embodiments, the controller device may select one virtual setting 1145 for producing audiovisual elements despite the user's location outside the detection ranges. For example, the controller device may select the virtual setting 1145 that was most recently associated with the user 1065. Thus, if the user 1065 had most recently been within the detection range of beacon device 1160-1, the controller device may produce audiovisual effects corresponding to the virtual setting 1145A. The controller device may continue with the selected virtual setting 1145 until the user 1065 is next detected by a beacon device 1160, or for a predetermined amount of time if the user 1065 remains undetected.

If the user 1065 is not detected by a beacon device 1160 for a period of time, the controller device may be further configured to prompt the user 1065 through visual, audio, haptic output, etc. to directly or indirectly suggest that the user 1065 should move to the one of the virtual settings 1145 to continue playback of the story. In one example, the controller device could produce a speech request (which could be voiced by a character consistent with the story) asking the user 1065 to move towards a particular storytelling device 1040 (e.g., an identifiable character). In another example, the controller device could display another virtual setting, such as an inhospitable environment having frightening monsters or other unpleasant characters. In another example, the controller device could produce a predetermined audio, visual, and/or haptic output that is designed to be annoying to the user 1065. In each case, once the user 1065 is subsequently detected by a beacon device 1160, the controller device may cease prompting the user 1065.

Figure 12B:
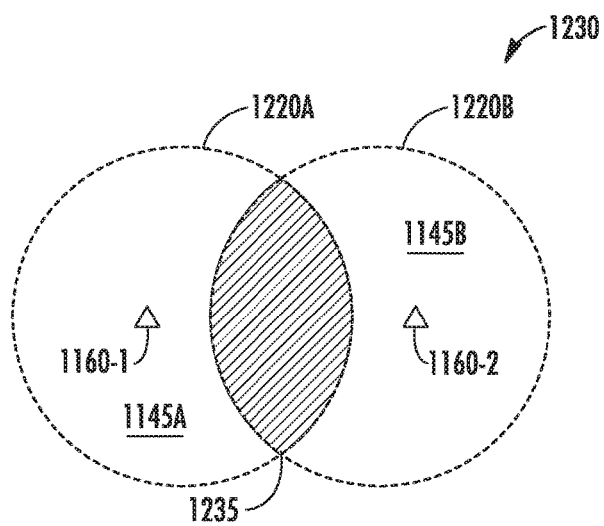
FIG. 12B illustrates an overlap region for detection ranges of a plurality of beacon devices, according to one embodiment described herein.

In some embodiments, as illustrated in the plan view 1230 of FIG. 12B, the detection ranges of beacon devices 1160-1, 1160-2 may partially overlap in an overlap region 1235. When the user 1065 is within the overlap region 1235, the controller device may select one of the virtual settings 1145A, 1145B to produce corresponding audiovisual elements for the user 1065 at a particular time. In one non-limiting example, the controller device may continue producing audiovisual elements for the most recent virtual setting 1145. Thus, if the user 1065 was previously within the detection range of beacon device 1160-1 and outside of the detection range of beacon device 1160-2 prior to entering the overlap region 1235, the controller device may continue producing audiovisual elements related to virtual setting 1145A. In another example, while the user 1065 is in the overlap region 1235 the controller device determines a distance of the user 1065 to each beacon device 1160-1, 1160-2 and selects the virtual setting 1145 corresponding to the shorter distance. In another example, while the user 1065 is in the overlap region 1235 the controller device fades in or out the audiovisual elements of one virtual setting 1145 depending on the distance of the user 1065 to each beacon device 1160.

Figure 12C:
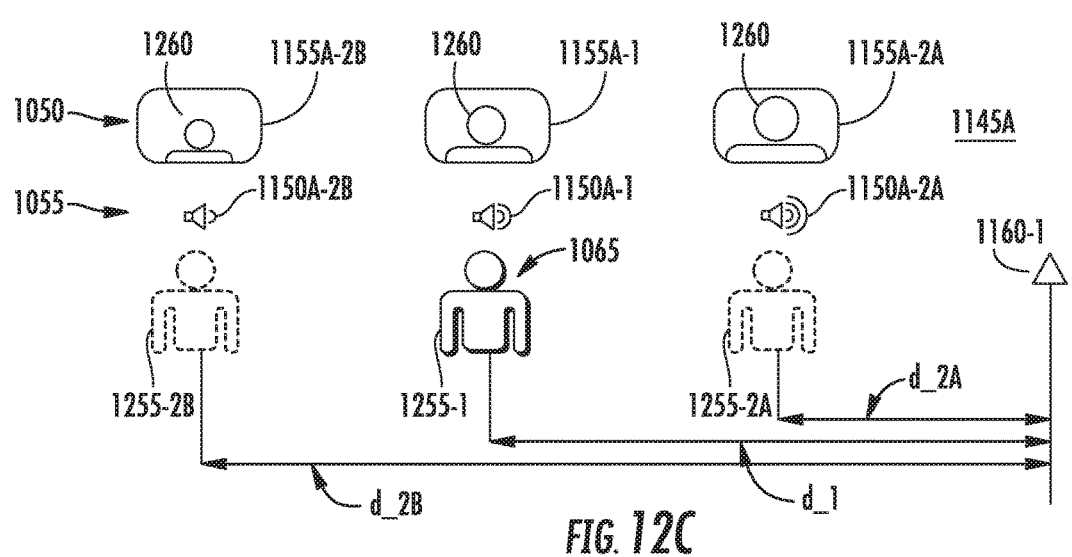
FIG. 12C illustrates dynamic adjustment to produced audiovisual elements based on a determined user distance from a beacon device, according to one embodiment.

FIG. 12C illustrates dynamic adjustment to produced audiovisual elements based on a determined user distance from a beacon device, according to one embodiment. In diagram 1250, the user 1065 begins at a first location 1255-1 (generically, location 1255) relative to a beacon device 1160-1.

The beacon device 1160-1 determines the distance $d_1$ corresponding to the location 1255-1, and may store the distance $d_1$ in memory. As user 1065 is within the detection range of beacon device 1160-1, the controller device produces audiovisual elements corresponding to the virtual setting 1145A. At the distance $d_1$, the controller device causes first visual elements 1155A-1 and first audio elements 1150A-1 to be produced using the display device 1050 and audio output device 1055. The first visual elements 1155A-1 includes a character 1260 associated with the virtual setting 1145A displayed on the display device 1050 at a first scale. The first audio elements 1150A-1 are produced at a first volume.

During playback of the story, the user 1065 may move throughout the storytelling environment to locations that are closer to the beacon device 1160-1 (i.e., position 1255-2A) or further from the beacon device 1160-1 (i.e., position 1255-2B). Position 1255-2A corresponds to a distance $d_{2A}$ less than distance $d_1$ that is determined by the beacon device 1160-1, and position 1255-2B corresponds to a distance $d_{2B}$ greater than distance $d_1$.

Based on two or more determined locations 1255, the controller device can determine whether the user 1065 is approaching the first beacon device 1160-1 or leaving (i.e., moving away from) the first beacon device 1160-1. The controller device may adapt the output of audiovisual elements related to the virtual setting 1145A based on whether the user 1065 approaches or leaves the first beacon device 1160-1.

In one embodiment, after an initial location 1255-1 of the user 1065 is determined, if a subsequent determined location 1255-2A indicates that the user is approaching the first beacon device 1160-1, the controller device increases the volume of the produced audio elements 1150A-2A generated by the audio output device 1055. Additionally or alternatively, the produced audio elements 1150A-2A may include one or more audio elements with different content than the produced audio elements 1150A-1. In one non-limiting example, an audio element from audio elements 1150A-1 may be indistinct speech (e.g., user 1065 perceives a character is speaking but cannot discern the words), which is replaced by understandable speech in audio elements 1150A-2A as the user 1065 approaches the first beacon device 1160-1.

In one embodiment, after an initial location 1255-1 of the user 1065 is determined, if a subsequent determined location 1255-2B indicates that the user is leaving the first beacon device 1160-1, the controller device decreases the volume of the produced audio elements 1150A-2B generated by the audio output device 1055. Additionally or alternatively, the produced audio elements 1150A-2B may include one or more audio elements with different content than the produced audio elements 1150A-1. Using a previous example, an audio element from audio elements 1150A-1 may be understandable speech from a character, which is replaced by indistinct speech in audio elements 1150A-2B as the user 1065 leaves the first beacon device 1160-1.

In one embodiment, the controller device may control the visual output of display device 1050 based on whether the user 1065 approaches or leaves the first beacon device 1160-1. For example, the controller device 1260 may control a scale of depicted characters 1260 or other objects of the visual elements 1155A based on a determined distance of the user 1065 from the first beacon device 1160-1. In visual elements 1155A-1, character 1260 has a first scale. In visual elements 1155A-2B, character 1260 has a smaller scale corresponding to a greater distance $d_{2B}$, and in visual elements 1155A-2A, character 1260 has a larger scale corresponding to a lesser distance $d_{2A}$. As with audio elements 1150A, the visual elements 1155A may include one or more visual elements with different content based on the distance of the user 1065 from the first beacon device 1160-1. In one non-limiting example, a visual element from visual elements 1155A-2A is displayed on the display device 1050 (such as a small character) when the user 1065 is at distance $d_{2A}$ or less from the first beacon device 1160-1, but the same visual element is not displayed when the user is at a distance greater than distance $d_{2A}$. In other words, the particular visual element is included in visual elements 1155A-2A but not visual elements 1155A-1 or visual elements 1155A-2B.

Figure 12D:
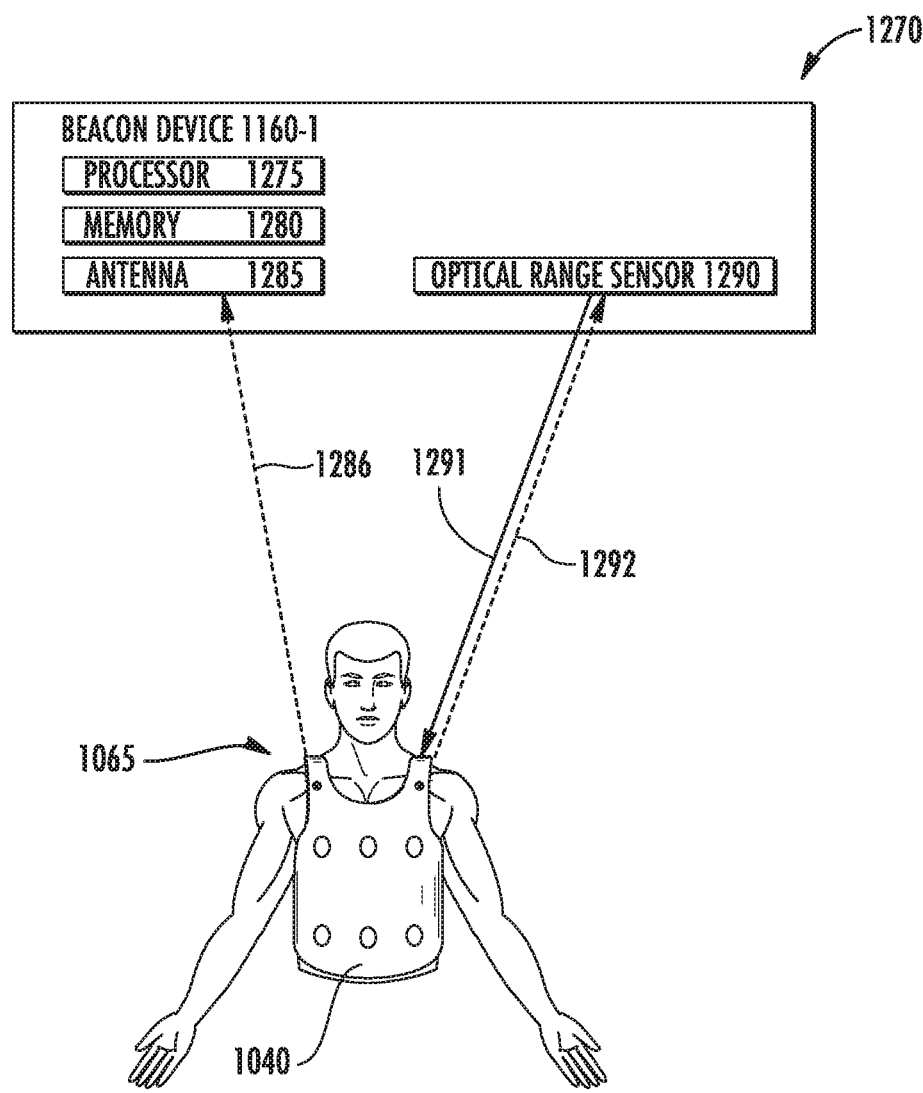
FIG. 12D illustrates exemplary techniques for determining user location using a beacon device, according to one embodiment.

FIG. 12D illustrates exemplary techniques for determining user location using a beacon device, according to one embodiment. In arrangement 1270, the beacon device 1160-1 is configured to determine a location of user 1065 during playback of the story.

Beacon device 1160-1 may be included in a storytelling device within the storytelling environment or separate from storytelling devices. The beacon device 1160-1 comprises a processor 1275 and memory 1280. Processor 1275 retrieves and executes programming instructions stored in the memory 1280. Processor 1275 is included to be representative of a single central processing unit (CPU), multiple CPUs, a single CPU having multiple processing cores, graphics processing units (GPUs) having multiple execution paths, and the like. The memory 1280 is generally included to be representative of a random access memory, but may further include non-volatile storage of any suitable types.

Beacon device 1160-1 is configured to determine a location of user 1065 using one or more means. As shown, beacon device 1160-1 includes an antenna 1285 configured to receive an RF signal 1286 transmitted by a storytelling device 1040 that is body-worn or carried by the user 1065. The processor 1275 is configured to perform processing on the received signal 1286, which includes determining a signal strength of the received signal 1286. The processor 1275 may use the determined signal strength to determine a distance of the user 1065 from the beacon device 1160-1.

Beacon device 1160-1 alternately includes an optical range sensor 1290 configured to perform optical range detection of the user 1065 by transmitting an optical signal 1291 and receiving a reflected signal 1292. Properties of the reflected signal 1292 can generally be used to determine a distance of the user 1065 from the beacon device 1160-1. Other non-limiting examples for determining a distance of the user 1065 from the beacon device 1160-1 include using a camera tracking functionality included in an AR or VR headset, using a discrete range detecting sensor device, and using a light-field camera ("plenoptic").

Figure 13:
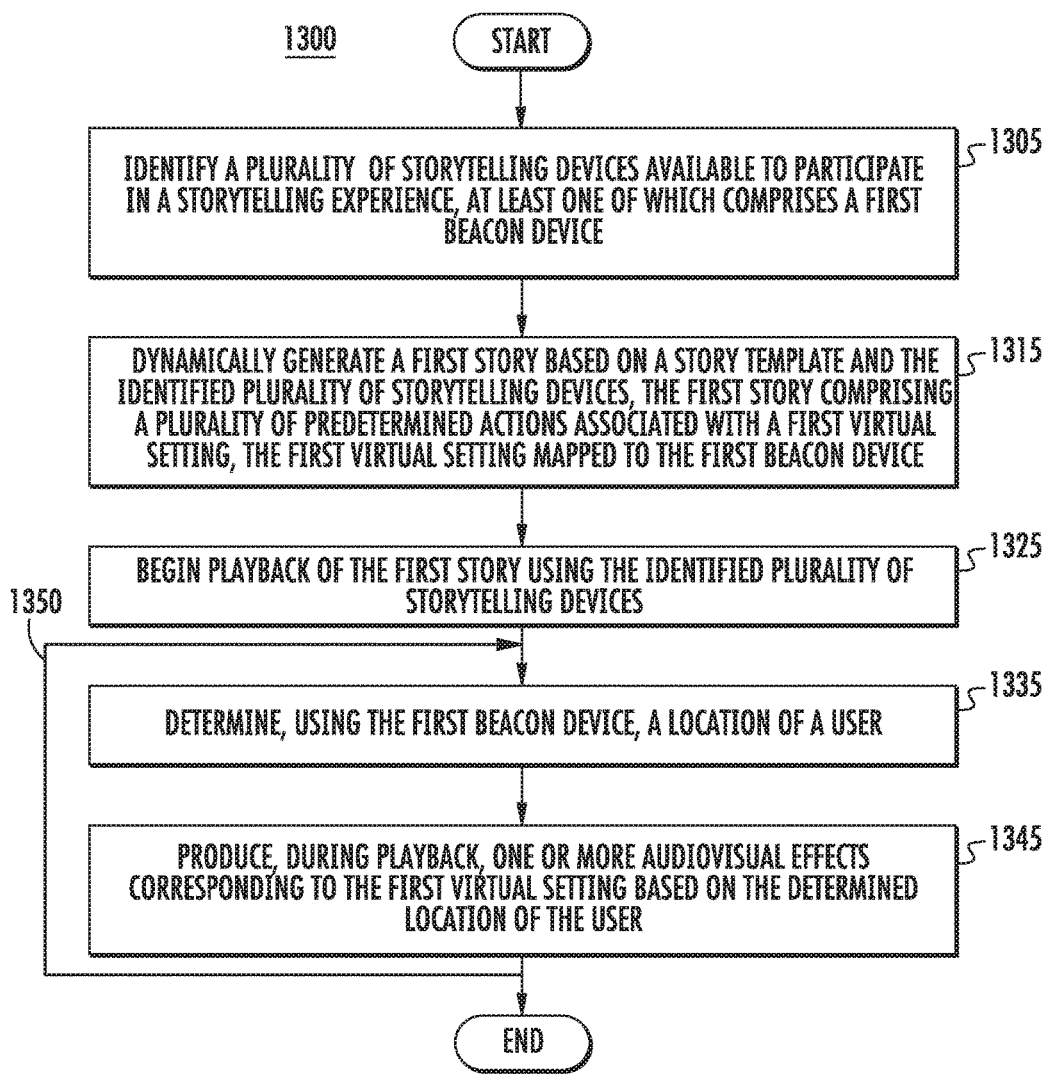
FIG. 13 is a block diagram illustrating a method of producing audiovisual effects for a virtual setting within a storytelling experience, according to one embodiment.

FIG. 13 is a block diagram illustrating a method of producing audiovisual effects for a virtual setting within a storytelling experience, according to one embodiment. The method 1300 may be performed by controller device (i.e., a controller storytelling device) and/or a bridge device. Further, the method 1300 may be performed consistent with any of the embodiments discussed above.

Method 1300 begins at block 1305, at which the controller device identifies a plurality of storytelling devices available to participate in a storytelling experience. At least one of the storytelling devices comprises a first beacon device configured to determine a location of a user.

At block 1315, the controller device generates a first story based on a story template and the identified plurality of storytelling devices. The story template may be selected based on the identified plurality of storytelling devices and/or user input. The first story comprises a plurality of predetermined actions that are associated with a first virtual setting. The controller device maps the first virtual setting to the first beacon device.

At block 1325, the controller device begins playback of the first story using the identified plurality of storytelling devices. At block 1335, the controller device determines, using the first beacon device, a location of the user. Based on the determined location of the user, at block 1345 the controller device produces, during playback of the first story, one or more audiovisual effects corresponding to the first virtual setting.

During playback of the story, the method 1300 may proceed from block 1345 along branch 1350 and return to block 1335 to determine an updated location of the user. Based on the updated location of the user, the controller device may adapt the produced audiovisual effects through subsequent iterations of block 1345, such as increasing or decreasing the volume of audio elements produced using an audio output device, changing a scale of visual elements displayed using a display device, and so forth. In some embodiments, the controller device may produce different audiovisual effects based on a change in determined distance of the user from the beacon device. The method 1300 may end following block 1345, or upon completion of playback of the story.

In some embodiments, multiple beacon devices are included in the storytelling environment that are each associated with a respective virtual setting of the story. The controller device is configured to dynamically select a virtual setting based on the determined user location, and the method 1300 may further include transitioning from the first virtual setting to producing one or more audiovisual effects corresponding to a second virtual setting.

Technical Description

Figure 14:
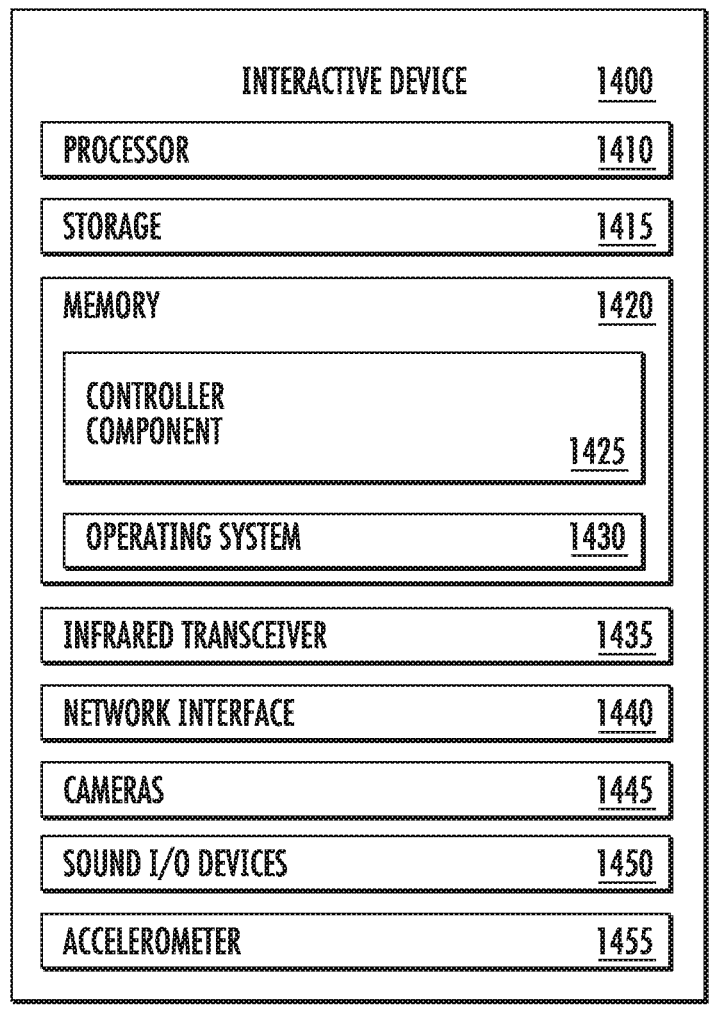
FIG. 14 is a block diagram illustrating an interactive device configured with a controller component, according to one embodiment described herein.

An example of an interactive storytelling device is shown in FIG. 14, which is a block diagram illustrating an interactive device configured with a controller component, according to one embodiment described herein. In this example, the interactive device 1400 includes, without limitation, a processor 1410, storage 1415, memory 1420, an infrared transceiver 1435, a network interface 1440, camera devices 1445, sound I/O devices 1450, and an accelerometer device 1455. Generally, the processor 1410 retrieves and executes programming instructions stored in the memory 1420. Processor 1410 is included to be representative of a single CPU, multiple CPUs, a single CPU having multiple processing cores, GPUs having multiple execution paths, and the like. The memory 1420 is generally included to be representative of a random access memory. The network interface 1440 enables the controller component 1425 to connect to a data communications network (e.g., wired Ethernet connection or an 802.11 wireless network).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 14, the memory 1420 represents any memory sufficiently large to hold the necessary programs and data structures. Memory 1420 could be one or a combination of memory devices, including Random Access Memory, nonvolatile or backup memory (e.g., programmable or Flash memories, read-only memories, etc.). In addition, memory 1420 and storage 1415 may be considered to include memory physically located elsewhere; for example, on another computer communicatively coupled to the interactive device 1400. Illustratively, the memory 1420 includes a controller component 1425 and an operating system 1430. The operating system 1430 generally controls the execution of application programs on the interactive device 1400. Examples of operating system 1530 include UNIX, a version of the Microsoft Windows® operating system, and distributions of the Linux® operating system. Additional examples of operating system 1530 include custom operating systems for gaming consoles, including the custom operating systems for systems such as the Nintendo DS® and Sony PSP®.

The infrared transceiver 1435 represents any device capable of sending and receiving infrared signals. In another embodiment, a device 1400 that only sends or receives infrared signals may be configured with an infrared transmitter or an infrared receiver, respectively, as opposed to the infrared transceiver 1435. The sound I/O devices 1450 could include devices such as microphones and speakers. For example, the speakers could be used to produce sound effects (e.g., explosion sound effects, dialogue, etc.) and/or to produce vibration effects.

Generally, the controller component 1425 provides logic for the interactive device 1400. For example, the controller component 1425 could be configured to detect that a coded infrared signal has been received (e.g., using the infrared transceiver 1435). The controller component 1425 could then determine a type of the infrared signal (e.g., based on data specified within the coded infrared signal) and could determine a corresponding response based on the determined type. For example, the controller component 1425 could determine that the infrared signal corresponds to a repulsor ray blast (e.g., from the Iron Man® action figure) and, in response, could increment a counter of received repulsor ray blasts. Additionally, the controller component 1425 could perform a corresponding action based on the counter. For example, if the controller component 1425 determines that the detected repulsor ray blast is the first blast received, the controller component 1425 could output a roaring sound effect (e.g., using a speaker 1450) and could manipulate a servomechanism on the device 1400 to produce a rocking effect (e.g., by rotating a lever mechanism positioned in the base of the device 1400 slightly). As another example, if the controller component 1425 determines that the repulsor ray blast was the fifth blast received, the controller component 1425 could output a groaning sound effect (e.g., using speaker 1450) and could manipulate the servomechanism such that the device 1400 falls over (e.g., by rotating a lever mechanism until the device 1400 falls over).

In the preceding, reference is made to embodiments of the disclosure. However, the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional examples of storytelling devices and story management and creation techniques, as well as proximity detection techniques and communication protocols, are provided in the attached appendices.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a plurality of storytelling devices in a plurality of distinct physical locations available to participate in a storytelling experience, wherein the storytelling experience comprises two or more predetermined virtual settings assigned to each of the plurality of distinct locations, each of the plurality of storytelling devices comprising an electronic device configured to perform at least one audiovisual effect, at least one of the plurality of storytelling devices comprising a first beacon device in a first distinct physical location and a second beacon device in a second distinct physical location;
   beginning playback of a first story of the storytelling experience, the first story comprising a first plurality of predetermined actions associated with a predetermined first virtual setting of the two or more predetermined virtual settings and a second plurality of predetermined actions associated with a predetermined second virtual setting of the two or more predetermined virtual settings, wherein the first plurality of predetermined actions and the second plurality of predetermined actions comprise one or more overlapping actions associated with the predetermined first virtual setting and the predetermined second virtual setting of the first story, wherein the predetermined first virtual setting is associated with the first beacon device, wherein each of the first plurality of predetermined actions is mapped to a corresponding one of the plurality of storytelling devices, wherein the predetermined second virtual setting is associated with the second beacon device, wherein each of the second plurality of predetermined actions is mapped to a corresponding one of the plurality of storytelling devices;
   determining, using the first beacon device, a first local location of a user within the first distinct physical location;
   during playback of the first story and using at least one of the plurality of storytelling devices, producing one or more of the at least one audiovisual effect corresponding to the first plurality of predetermined actions and the overlapping actions of the first virtual setting based on the first local location of the user;

determining, using the second beacon device, a second local location of the user within the second distinct physical location; and during playback of the first story and using at least one of the plurality of storytelling devices, producing at least one of the one or more of the at least one audiovisual effect corresponding to the second plurality of predetermined actions and overlapping actions of the second virtual setting based on the second local location of the user.

2. The method of claim 1, wherein the plurality of storytelling devices comprises a display device, wherein producing one or more audiovisual effects corresponding to the first story setting comprises displaying one or more predetermined visual elements associated with the first story setting using the display device.

3. The method of claim 1, wherein the plurality of storytelling devices comprises an audio output device, wherein producing one or more audiovisual effects corresponding to the first story setting comprises producing one or more predetermined audio elements associated with the first story setting using the audio output device.

4. The method of claim 3, wherein determining the location of the user comprises determining an initial location and a subsequent location of the user, the method further comprising at least one of:

increasing a volume of the produced one or more predetermined audio elements when the subsequent location indicates that the user is approaching the first beacon device, and decreasing the volume of the produced one or more predetermined audio elements when the subsequent location indicates that the user is leaving the first beacon device.

5. The method of claim 1, wherein producing the one or more audiovisual effects corresponding to the first virtual setting comprises:

selecting, based on the determined location of the user, the first virtual setting during playback of the story upon determining that the user is closer to the first local location than the second local location.

6. The method of claim 1, wherein the plurality of storytelling devices comprises a device that is body-worn or carried by the user, wherein the location of the user is determined based on a signal received from the body-worn or carried device.

7. The method of claim 6, wherein determining the location of the user comprises one of measuring a signal strength of a received signal from the body-worn or carried device, and performing optical range detection based on a reflected signal from the body-worn or carried device.

8. A non-transitory computer-readable medium comprising computer program code that, when executed by operation of one or more computer processors, performs an operation comprising:

identifying a plurality of storytelling devices in a plurality of distinct locations available to participate in a storytelling experience, wherein the storytelling experience comprises two or more predetermined virtual settings, where at least one predetermined virtual setting is assigned to each of the plurality of distinct locations, each of the plurality of storytelling devices comprising an electronic device configured to perform at least one audiovisual effect, at least one of the plurality of storytelling devices comprising a first beacon device in a first distinct physical location and a second beacon device in a second distinct physical location;

beginning playback of a first story of the storytelling experience, the first story comprising a first plurality of predetermined actions associated with a predetermined first virtual setting of the two or more predetermined virtual settings and a second plurality of predetermined actions associated with a predetermined second virtual setting of the two or more predetermined virtual settings, wherein the first plurality of predetermined actions and the second plurality of predetermined actions comprise one or more overlapping actions associated with the predetermined first virtual setting and the predetermined second virtual setting of the first story, wherein the predetermined first virtual setting is associated with the first beacon device, wherein each of the first plurality of predetermined actions is mapped to a corresponding one of the plurality of storytelling devices, wherein the predetermined second virtual setting is associated with the second beacon device, wherein each of the second plurality of predetermined actions is mapped to a corresponding one of the plurality of storytelling devices;

determining, using the first beacon device, a first local location of a user within the first distinct physical location;

during playback of the first story and using at least one of the plurality of storytelling devices, producing one or more of the at least one audiovisual effect corresponding to the first plurality of predetermined actions and the overlapping actions of the first virtual setting based on the first local location of the user;

determining, using the second beacon device, a second local location of the user within the second distinct physical location; and during playback of the first story and using at least one of the plurality of storytelling devices, producing at least one of the one or more of the at least one audiovisual effect corresponding to the second plurality of predetermined actions and overlapping actions of the second virtual setting based on the second local location of the user.

9. The computer-readable medium of claim 8, wherein the plurality of storytelling devices comprises a display device, wherein producing one or more audiovisual effects corresponding to the first story setting comprises displaying one or more predetermined visual elements associated with the first story setting using the display device.

10. The computer-readable medium of claim 8, wherein the plurality of storytelling devices comprises an audio output device, wherein producing one or more audiovisual effects corresponding to the first story setting comprises producing one or more predetermined audio elements associated with the first story setting using the audio output device.

11. The computer-readable medium of claim 10, wherein determining the location of the user comprises determining an initial location and a subsequent location of the user, the operation further comprising at least one of:

increasing a volume of the produced one or more predetermined audio elements when the subsequent location indicates that the user is approaching the first beacon device, and decreasing the volume of the produced one or more predetermined audio elements when the subsequent location indicates that the user is leaving the first beacon device.

12. The computer-readable medium of claim 8,
wherein producing the one or more audiovisual effects corresponding to the first virtual setting comprises:
selecting, based on the determined location of the user, the first virtual setting during playback of the story upon determining that the user is closer to the first local location than the second local location.

13. The computer-readable medium of claim 8, wherein the plurality of storytelling devices comprises a device that is body-worn or carried by the user, wherein the location of the user is determined based on a signal received from the body-worn or carried device.

14. The computer-readable medium of claim 13, wherein determining the location of the user comprises one of measuring a signal strength of a received signal from the body-worn or carried device, and performing optical range detection based on a reflected signal from the body-worn or carried device.

15. A system, comprising:
a plurality of storytelling devices in a plurality of distinct locations, each of the plurality of storytelling devices comprising an electronic device configured to perform at least one audiovisual effect, at least one of the plurality of the storytelling devices comprising a first beacon device; and
control logic configured to perform an operation comprising:
identifying a plurality of storytelling devices in a plurality of locations available to participate in a storytelling experience, wherein the storytelling experience comprises two or more predetermined virtual settings, where at least one predetermined virtual setting is assigned to each of the plurality of distinct locations, each of the plurality of storytelling devices comprising an electronic device configured to perform at least one audiovisual effect, at least one of the plurality of storytelling devices comprising a first beacon device in a first distinct physical location and a second beacon device in a second distinct physical location;
beginning playback of a first story of the storytelling experience, the first story comprising a first plurality of predetermined actions associated with a predetermined first virtual setting of the one or more predetermined virtual settings and a second plurality of predetermined actions associated with a predetermined second virtual setting of the two or more predetermined virtual settings, wherein the first plurality of predetermined actions and the second plurality of predetermined actions comprise one or more overlapping actions associated with the first virtual setting and the second virtual setting of the first story, wherein the predetermined first virtual setting is associated with the first beacon device, wherein each of the first plurality of predetermined actions is mapped to a corresponding one of the plurality of storytelling devices, wherein the predetermined second virtual setting is associated with the second beacon device, wherein each of the second plurality of predetermined actions is mapped to a corresponding one of the plurality of storytelling devices;
determining, using the first beacon device, a first local location of a user within the first distinct physical location;
during playback of the first story and using at least one of the plurality of storytelling devices, producing one or more of the at least one audiovisual effect corresponding to the first plurality of predetermined actions and the overlapping actions of the first virtual setting based on the first local location of the user;
determining, using the second beacon device, a second local location of the user within the second distinct physical location; and during playback of the first story and using at least one of the plurality of storytelling devices, producing at least one of the one or more of the at least one audiovisual effect corresponding to the second plurality of predetermined actions and overlapping actions of the second virtual setting based on the second local location of the user.

16. The system of claim 15, wherein the plurality of storytelling devices comprises a display device, wherein producing one or more audiovisual effects corresponding to the first story setting comprises displaying one or more predetermined visual elements associated with the first story setting using the display device.

17. The system of claim 15, wherein the plurality of storytelling devices comprises an audio output device, wherein producing one or more audiovisual effects corresponding to the first story setting comprises producing one or more predetermined audio elements associated with the first story setting using the audio output device.

18. The system of claim 17, wherein determining the location of the user comprises determining an initial location and a subsequent location of the user, the operation further comprising at least one of:
increasing a volume of the produced one or more predetermined audio elements when the subsequent location indicates that the user is approaching the first beacon device, and
decreasing the volume of the produced one or more predetermined audio elements when the subsequent location indicates that the user is leaving the first beacon device.

19. The system of claim 15,
wherein producing the one or more audiovisual effects corresponding to the first virtual setting comprises:
selecting, based on the determined location of the user, the first virtual setting during playback of the story upon determining that the user is closer to the first local location than the second local location.

20. The system of claim 15, wherein the plurality of storytelling devices comprises a device that is body-worn or carried by the user, wherein the location of the user is determined based on a signal received from the body-worn or carried device.

* * * * *

UNITED STATES PATENT AND TRADEMARK OFFICE
CERTIFICATE OF CORRECTION

PATENT NO. : 10,369,487 B2
APPLICATION NO. : 15/041615
DATED : August 6, 2019
INVENTOR(S) : Michael P. Goslin et al.

Page 1 of 1

It is certified that error appears in the above-identified patent and that said Letters Patent is hereby corrected as shown below:

On the Title Page

In item (73), in Column 1, in "Assignee", Line 1, delete "Enterprises." and insert -- Enterprises, --, therefor.

In the Specification

In Column 8, Line 55, delete "first" and insert -- fist --, therefor.

Signed and Sealed this
Twenty-second Day of October, 2019

Andrei Iancu
*Director of the United States Patent and Trademark Office*